(12) United States Patent
Kohli et al.

(10) Patent No.: US 11,820,626 B2
(45) Date of Patent: Nov. 21, 2023

(54) SYSTEMS AND METHODS FOR ELECTRICAL CORD STORAGE

(71) Applicants: Ryan Kohli, Plain City, UT (US);
Kevin Neumayer, Ogden, UT (US);
Krystal Neumayer, Ogden, UT (US)

(72) Inventors: Ryan Kohli, Plain City, UT (US);
Kevin Neumayer, Ogden, UT (US);
Krystal Neumayer, Ogden, UT (US)

(*) Notice: Subject to any disclaimer, the term of this patent is extended or adjusted under 35 U.S.C. 154(b) by 786 days.

(21) Appl. No.: 16/868,477

(22) Filed: May 6, 2020

(65) Prior Publication Data

US 2020/0354185 A1 Nov. 12, 2020

Related U.S. Application Data

(63) Continuation of application No. 29/716,576, filed on Dec. 10, 2019, now Pat. No. Des. 913,776.

(60) Provisional application No. 62/946,346, filed on Dec. 10, 2019, provisional application No. 62/844,125, filed on May 7, 2019.

(51) Int. Cl.
*B65H 75/22* (2006.01)
*B65H 75/44* (2006.01)
*H02G 1/00* (2006.01)
*H02G 11/02* (2006.01)

(52) U.S. Cl.
CPC ..... *B65H 75/4421* (2013.01); *B65H 75/2209* (2021.05); *H02G 1/00* (2013.01); *H02G 11/02* (2013.01)

(58) Field of Classification Search
CPC ...... B65H 75/22; B65H 75/26; B65H 75/143; B65H 75/446; B65H 75/4421; H02G 1/00; H02G 11/02
See application file for complete search history.

(56) References Cited

U.S. PATENT DOCUMENTS

| | | |
|---|---|---|
| D88,337 S | 11/1932 | Massey |
| 2,364,262 A | 12/1944 | Wehringer |
| 2,656,991 A | 10/1953 | Neely |
| 2,838,905 A | 6/1958 | Marble |
| 2,865,071 A | 12/1958 | Clemens |
| 3,208,121 A | 9/1965 | Price |

(Continued)

FOREIGN PATENT DOCUMENTS

| | | |
|---|---|---|
| EP | 2827609 A1 | 1/2015 |
| WO | WO 2015/183743 A1 | 12/2015 |
| WO | WO 2016/156621 A1 | 10/2016 |

*Primary Examiner* — Sang K Kim
(74) *Attorney, Agent, or Firm* — Bryant J. Keller; Kirton McConkie

(57) ABSTRACT

An electrical cord storage device is adapted to be affixed to an electrical appliance. The device includes a base having a first surface shaped to substantially conform to and adapted to be affixed to a surface of an electrical appliance and a second surface opposed to the first surface. The device also includes a post having a first end affixed to the base and extending from the second surface of the base to a second end to form a cord-wrapping structure adapted to receive an electrical cord of the electrical appliance wound thereon. The device further includes a dome affixed to the second end of the post, extending radially away from the post, and curving toward an imaginary plane substantially normal to the post located at the first end of the post. Other implementations are described.

20 Claims, 30 Drawing Sheets

(56) References Cited

U.S. PATENT DOCUMENTS

| | | |
|---|---|---|
| 4,726,536 A | 2/1988 | Lerner et al. |
| 4,802,638 A | 2/1989 | Burger et al. |
| 5,230,480 A | 7/1993 | Perry |
| 5,372,225 A | 12/1994 | Joynes et al. |
| 5,588,626 A | 12/1996 | Yang |
| 5,848,701 A | 12/1998 | Riccabona |
| 5,853,136 A | 12/1998 | Lai |
| D410,631 S | 6/1999 | Foster |
| 5,915,640 A | 6/1999 | Wagter et al. |
| 5,984,224 A | 11/1999 | Yang |
| 6,065,709 A | 5/2000 | Wagter et al. |
| 6,164,582 A | 12/2000 | Vara |
| 6,439,490 B1 | 8/2002 | Hwang |
| 6,474,585 B2 | 11/2002 | Liao |
| 6,554,218 B2 | 4/2003 | Buyce et al. |
| 6,600,479 B1 | 7/2003 | Smith et al. |
| 6,612,515 B1 | 9/2003 | Tinucci et al. |
| 6,643,443 B2 | 11/2003 | Holman et al. |
| 7,035,399 B2 * | 4/2006 | Gemme ............ B65H 75/2227 379/413.04 |
| 7,077,693 B1 | 7/2006 | Symons |
| D569,710 S | 5/2008 | Young |
| 7,888,608 B2 | 2/2011 | Hybiske et al. |
| 8,091,820 B2 * | 1/2012 | Thorn ............... B65H 75/2227 242/405 |
| D658,482 S | 5/2012 | Pratt |
| 8,167,102 B2 * | 5/2012 | Skillman ............. B65H 75/143 191/12.2 R |
| D692,293 S | 10/2013 | Toscani et al. |
| 8,590,823 B2 | 11/2013 | Rothbaum et al. |
| 8,695,913 B2 | 4/2014 | Cheng |
| 8,781,148 B2 | 7/2014 | Minarik et al. |
| D737,119 S | 8/2015 | Condon et al. |
| 9,288,566 B2 | 3/2016 | Minarik et al. |
| 9,445,180 B1 | 9/2016 | Tite |
| D774,383 S | 12/2016 | Kennedy |
| D778,712 S | 2/2017 | Kennedy |
| 9,890,012 B1 | 2/2018 | Polen |
| 9,908,741 B2 | 3/2018 | Rodriguez et al. |
| D840,947 S | 2/2019 | Pierce |
| D886,093 S | 6/2020 | Dubanowich |
| 2002/0145073 A1 | 10/2002 | Swanson et al. |
| 2003/0038209 A1 | 2/2003 | Remeczky |
| 2006/0160412 A1 | 7/2006 | Symons |
| 2006/0186255 A1 | 8/2006 | Rooker |
| 2010/0224714 A1 | 9/2010 | Winther et al. |
| 2013/0221145 A1 | 8/2013 | Reynolds |
| 2014/0079275 A1 | 7/2014 | Minarik et al. |
| 2015/0304756 A1 | 10/2015 | Abfall et al. |
| 2016/0050481 A1 | 2/2016 | Moats |
| 2016/0204560 A1 | 7/2016 | Rodriguez et al. |
| 2016/0229660 A1 * | 8/2016 | Ronnie ................ B65H 75/28 |
| 2018/0338196 A1 | 11/2018 | Freedman |

\* cited by examiner

SYSTEMS AND METHODS FOR ELECTRICAL CORD STORAGE

CROSS-REFERENCE TO RELATED APPLICATIONS

This application claims the benefit of U.S. Provisional Application No. 62/844,125, which was filed May 7, 2019, and which is entitled ELECTRICAL APPLIANCE CORD STORAGE; this application also claims the benefit of U.S. Provisional Application No. 62/946,346, which was filed Dec. 10, 2019, and which is entitled SYSTEMS AND METHODS FOR ELECTRICAL CORD STORAGE; and this application also claims the benefit of U.S. Non-Provisional Design Application No. 29/716,576, which was filed Dec. 10, 2019, and which is entitled ELECTRICAL CORD STORAGE DEVICE; the entire disclosures of which are hereby incorporated herein by reference.

BACKGROUND

1. Field of the Invention

The present invention relates to storage of electrical cords for small appliances and the like, and more particularly to systems and methods for providing on-appliance storage of electrical cords when not in use.

2. Background and Related Art

Many small appliances and other electrical devices are typically used only occasionally. The rest of the time, the cords of the small appliances either remain plugged in or are unplugged until a next use. In the meantime, the electrical cords of such appliances or devices remain hanging off of the appliances or devices, whether plugged in or not. Sometimes, users attempt to address the problem by wrapping a secondary cord or device around a portion of the electrical cord such that at least that portion of the electrical cord is more orderly, but there still remains a significant amount of electrical cord not so wrapped and even the wrapped portion still hangs off the appliance or device and generally gets in the way.

For some devices or appliances, users sometimes store their electrical cords by wrapping the cords around the device or appliance itself, but this can be problematic in that the device or appliance often does not store as it otherwise would, or when it comes time to use the device or appliance, the user must unwrap the entire electrical cord from the appliance or device before use. Accordingly, for reasons such as these, existing cord management options are limited and insufficient to adequately address the requirements of convenient and adequate electrical cord storage.

BRIEF SUMMARY

Implementation of the invention provides devices, systems, and methods for storing electrical cords of electrical appliances and other electrical devices (herein generally referred to as "electrical appliances"). The innovative devices, systems, and methods provide a device that is adapted to be attached to a surface of the electrical appliance to provide a location for winding an electrical cord (or a desired length thereof) of the electrical appliance thereon. The use of implementations of the invention address at least some of the difficulties previously inherent in managing electrical cords of electrical appliances.

According to illustrative implementations, an electrical cord storage device is adapted to be affixed to an electrical appliance. The device includes a base having a first surface shaped to substantially conform to and adapted to be affixed to a surface of an electrical appliance and a second surface opposed to the first surface. The device also includes a post having a first end affixed to the base and extending from the second surface of the base to a second end to form a cord-wrapping structure adapted to receive an electrical cord of the electrical appliance wound thereon. The device further includes a dome (or other suitably shaped object) affixed to the second end of the post, extending radially away from (or in any other suitable manner out from) the post, and curving toward an imaginary plane substantially normal to the post located at the first end of the post.

In some implementations, the base is integrally formed with the post. In some implementations, the dome is integrally formed with the post. In some implementations, the base, the post, and the dome are all integrally formed together. In some other implementations, however, the base, the post, and/or the dome are configured to be coupled together in any suitable manner, including, without limitation, via one or more frictional engagements, mechanical engagements, catches, clasps, pins, threaded engagements, adhesives, fasteners, and/or in any other suitable manner.

In certain implementations, the base is formed of (or otherwise comprises) a flexible and/or heat-tolerant material, whereby the base may be flexed to better adapt to a shape of the surface of the electrical appliance and/or can tolerate a normal range of operating temperatures of the electrical appliance at the surface of the electrical appliance. In certain implementations, the dome is optionally formed of (or otherwise comprises) a flexible material such that the dome is adapted to flex as the electrical cord is wound around the post. In some optional implementations, the flexible material of the dome permits a force applied to the dome to cause the dome to invert such that the dome curves away from the imaginary plane as it extends radially away from the post.

In some implementations, the dome includes one or more scalloped edges spaced around the post—the scalloped edge being adapted to reduce unintended unwinding of the electrical cord from around the post. In some implementations, the dome includes one or more nubs on a base-facing surface thereof—the nubs being adapted to reduce unintended unwinding of the electrical cord from around the post. In some implementations, the dome comprises one or more notches that are adapted to receive a portion of the electrical cord at a desired wound length to secure the electrical cord at the desired wound length.

In some implementations, an outer edge of the dome is spaced apart from the imaginary plane a distance adapted to permit entry of the electrical cord and adapted to generally prevent unintended unwinding of the electrical cord from the post. In some implementations, a volume generally defined by the base and the dome is sized to permit winding of substantially the entire electrical cord therein. In some implementations, the volume generally defined by the base and the dome is sized to snugly permit winding of substantially the entire electrical cord therein.

In some implementations, the device includes an affixation material affixed to the first surface of the base and adapted to be affixed to the surface of the electrical appliance. In some implementations, the affixation material is affixed to the first surface of the base in a recess (and/or any other suitable portion) of the first surface of the base. In this regard, the device can include any suitable affixation material, including, without limitation, one or more pieces of double-sided tape, adhesives, pressure-sensitive adhesives, glues, epoxies, suction cups, frictional engagements, clamps, mechanical engagements, and/or any other suitable material that is capable of affixing the device to an electrical appliance.

According to further illustrative implementations, a method is disclosed for providing storage for an electrical cord on a surface of an electrical appliance. The method includes a step of providing an electrical cord storage device. The device includes a base having a first surface shaped to substantially conform to and adapted to be affixed to a surface of an electrical appliance and a second surface opposed to the first surface. The device also includes a post having a first end affixed to the base and extending from the second surface of the base to a second end to form a cord-wrapping structure adapted to receive an electrical cord of the electrical appliance wound thereon. Some implementations of the device further include a dome affixed to the second end of the post and extending radially away from the post and curving toward an imaginary plane substantially normal to the post located at the first end of the post. The method also includes steps of affixing the electrical cord storage device to the surface of the electrical appliance and winding the electrical cord around the post generally between the base and the dome until a desired length of the electrical cord is wound around the post.

In some implementations, the method also includes a step of securing a plug end of the electrical cord under the dome. In certain implementations, the method includes a step of securing a plug end of the electrical cord in a scalloped edge of the dome.

In some implementations, the step of affixing the electrical cord storage device to the surface of the electrical appliance includes using an adhesive (and/or any other suitable affixation material) between the electrical cord storage device and the surface of the electrical appliance. In some implementations, affixation of the electrical cord storage device to the surface of the electrical appliance is either substantially permanent or reversible.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

Figure 1:
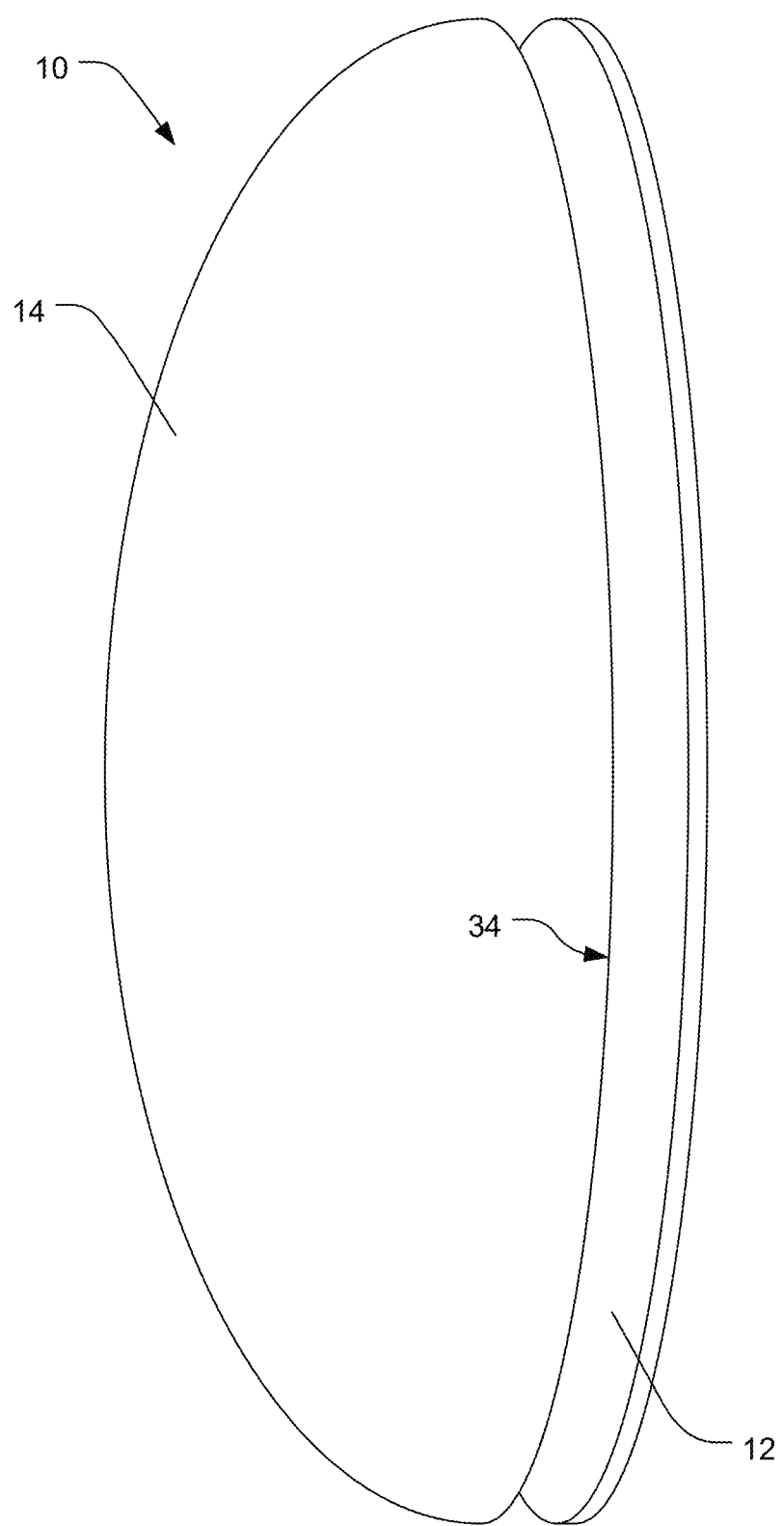
FIG. 1 shows a perspective view of one embodiment of a device for storing an electrical cord of an appliance.

A description of embodiments of the present invention will now be given with reference to the drawings. It is expected that the present invention may take many other forms and shapes, hence the following disclosure is intended to be illustrative and not limiting, and the scope of the invention should be determined by reference to the appended claims.

Embodiments of the invention provide devices, systems, and methods for storing electrical cords of electrical appliances and other electrical devices (herein generally referred to as "electrical appliances"). By way of example, "electrical appliances" include both small electrical appliances, such as small kitchen appliances (e.g., toasters, mixers, blenders, slow cookers, microwaves, pressure cookers, multi-functional cooking devices, hot plates, fryers, coffee makers, pressure cookers, crock pots, lamps, griddles, toaster ovens, and the like), larger kitchen appliances (e.g., refrigerators, larger microwaves, and the like), appliances for rooms other than the kitchen (e.g., vacuums and the like), and essentially any electrical device having an electrical cord (e.g., televisions, audio equipment, irons, computers, and the like). Accordingly, when used herein and in the claims, the terms "electrical appliances" and "appliances" are intended to be expansive in scope unless specifically indicated otherwise.

The innovative devices, systems, and methods provide a device that is adapted to be attached to a surface of the electrical appliance to provide a location for winding an electrical cord (or a desired length thereof) of the electrical appliance thereon. The use of embodiments of the invention address the difficulties previously inherent in managing electrical cords of electrical appliances.

According to illustrative embodiments of the invention, an electrical cord storage device is adapted to be affixed to an electrical appliance. In some embodiments, the device includes a base having a first surface shaped to substantially conform to and/or is otherwise adapted to be affixed to a surface of an electrical appliance, and a second surface opposed to the first surface. Some embodiments of the device also include a post having a first end affixed to the base and extending from the second surface of the base to a second end to form a cord-wrapping structure adapted to receive an electrical cord of the electrical appliance wound thereon. Some embodiments of the device further include a dome (and/or any other suitable object) affixed to the second end of the post, extending radially away from the post, and curving toward an imaginary plane substantially normal to (and/or towards any other suitable portion of) the post located at the first end of the post.

In some embodiments, the base is integrally formed with the post. In some embodiments, the dome is integrally formed with the post. In some embodiments, the base, the post, and the dome are all integrally formed together. In some embodiments, however, the base, the post, and/or the dome are configured to be coupled together in any suitable manner, including, without limitation, via one or more frictional engagements, mechanical engagements, clasps, adhesives, glues, epoxies, catches, pins, threaded engagements, and/or in any other suitable manner.

In certain embodiments, the base is formed of (or otherwise comprises) a flexible and/or heat-tolerant material, whereby the base may be flexed to better adapt to a shape of the surface of the electrical appliance and/or can tolerate a normal range of operating temperatures of the electrical appliance at the surface of the electrical appliance. In certain embodiments, the dome is formed of (or otherwise comprises) a flexible material such that the dome is adapted to flex as the electrical cord is wound around the post. In some embodiments, the flexible material of the dome permits a force applied to the dome to cause the dome to invert such that the dome curves away from the imaginary plane as it extends radially away from the post.

In some embodiments, the dome includes one or more scalloped edges spaced around the post, the scalloped edges being adapted to reduce unintended unwinding of the electrical cord from around the post. In some embodiments, the dome includes one or more nubs (or other protrusions) on a base-facing (and/or any other suitable) surface thereof, the nubs (or other protrusions) being adapted to reduce unintended unwinding of the electrical cord from around the post. In some embodiments, the dome comprises one or more notches that are adapted to receive a portion of the electrical cord at a desired wound length to secure the electrical cord at the desired wound length.

In some embodiments, one or more portions of an outer edge of the dome is spaced apart from the imaginary plane by a distance that is adapted to permit entry of the electrical cord and adapted to generally prevent unintended unwinding of the electrical cord from the post. In some embodiments, a volume generally defined by the base and the dome is sized to permit winding of substantially the entire electrical cord therein. In some embodiments, the volume generally defined by the base and the dome is sized to snugly permit winding of substantially the entire electrical cord therein.

In some embodiments, the device includes one or more affixation materials affixed to the first surface of the base and adapted to be affixed to the surface of the electrical appliance. In some embodiments, the affixation material is affixed to the first surface of the base in a recess (and/or any other suitable portion) of the first surface of the base. In this regard, the device can include any suitable affixation material, including, without limitation, one or more pieces of double-sided tape, adhesives, pressure-sensitive adhesives, glues, epoxies, suction cups, frictional engagements, clamps, mechanical engagements, and/or any other suitable material that is capable of affixing the device to an electrical appliance.

According to further illustrative embodiments of the invention, a method is disclosed for providing storage for an electrical cord on a surface of an electrical appliance. The method includes a step of providing an electrical cord storage device. In accordance with some embodiments, the device includes a base having a first surface shaped to substantially conform to and/or adapted to be affixed to a surface of an electrical appliance and a second surface opposed to the first surface. In some embodiments, the device also includes a post having a first end affixed to (e.g., formed with, extending from, and/or otherwise coupled to) the base and extending from the second surface of the base to a second end to form a cord-wrapping structure adapted to receive an electrical cord of the electrical appliance wound thereon. Some embodiments of the device further include a dome (and/or any other suitable shaped object) affixed to the second end of the post and extending radially away from the post and curving toward an imaginary plane substantially normal to the post located at the first end of the post. The method also includes steps of affixing the electrical cord storage device to the surface of the electrical appliance and winding the electrical cord around the post generally between the base and the dome until a desired length of the electrical cord is wound around the post.

In some embodiments, the method also includes a step of securing a plug end of the electrical cord under the dome. In certain embodiments, the method includes a step of securing a plug end of the electrical cord at a scalloped edge of the dome.

In some embodiments, the step of affixing the electrical cord storage device to the surface of the electrical appliance includes using an adhesive (and/or any other suitable affixation material) between the electrical cord storage device and the surface of the electrical appliance. In some embodiments, affixation of the electrical cord storage device to the surface of the electrical appliance is either substantially permanent or reversible.

FIG. 1 shows a perspective view of one embodiment of an electrical cord storage device 10. In accordance with this embodiment, the device 10 includes a base 12 and a dome 14. The base 12 and the dome 14 are connected by one or more posts 16 (or stems, rods, necks, and/or other generally elongate elements extending between the base 12 and the dome 14, collectively referred to as "post 16") as may be seen in the side view of the device 10 of FIG. 2. As may be seen in FIG. 2, the base 12 of this embodiment comprises a portion that is generally or substantially planar, at least on an appliance-contacting surface 18 of the base 12. In some such embodiments, the generally planar appliance-contacting surface 18 of the base 12 is adapted to be affixed to a generally planar surface of an appliance. In some embodiments, the base 12 is formed of a flexible material, such as a rubbery material, a silicone material, a polymer material, a plastic material, and/or any other suitable flexible material, so that the base 12 can be flexed so as to better conform to the surface of the appliance. Accordingly, the base 12 of some embodiments, even embodiments where a natural position of the base 12 is generally planar, can be flexed to generally conform to the surface to which it is attached.

Figure 2:
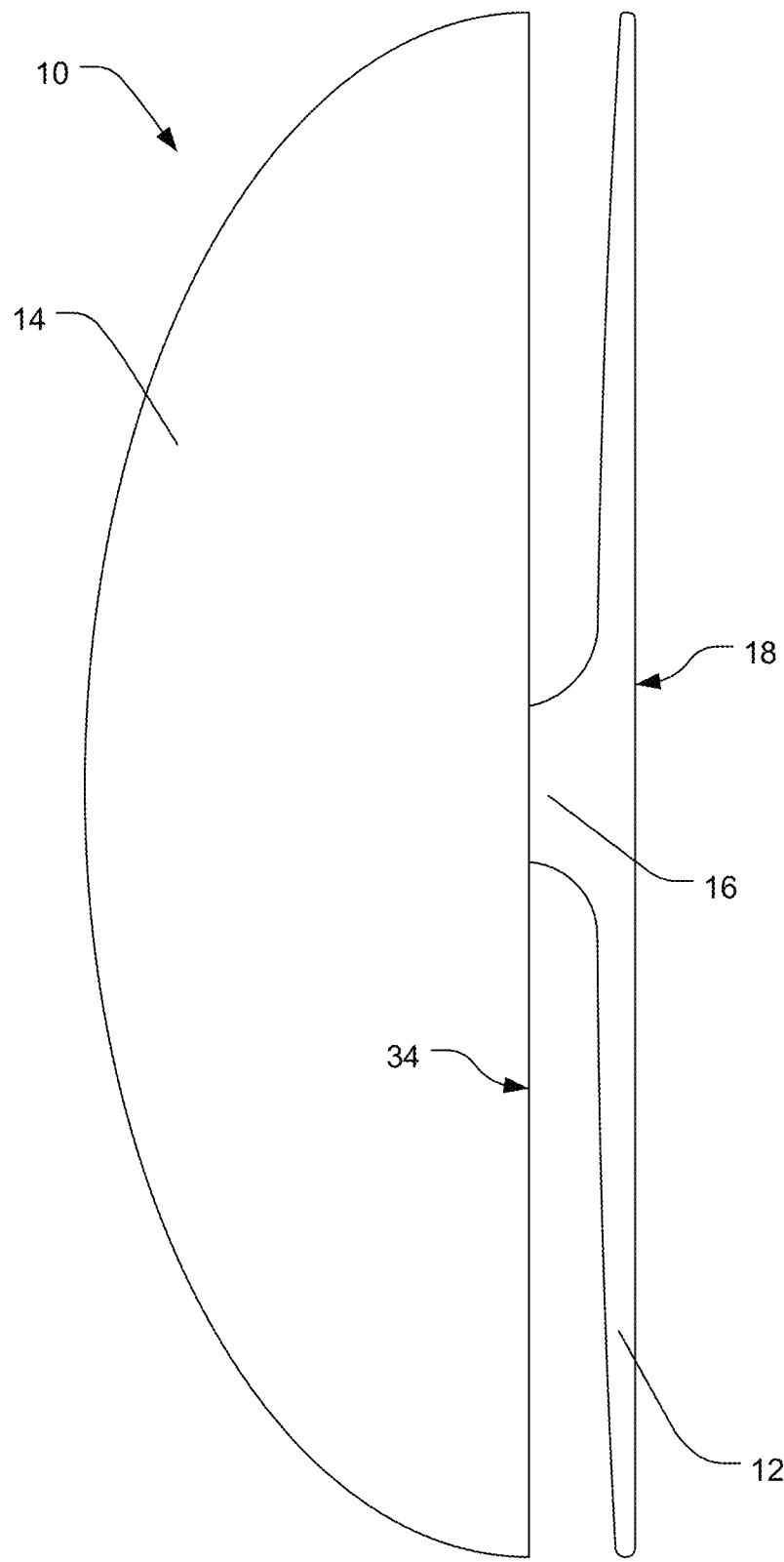
FIG. 2 shows a side view of one embodiment of a device for storing an electrical cord of an appliance.
Figure 3:
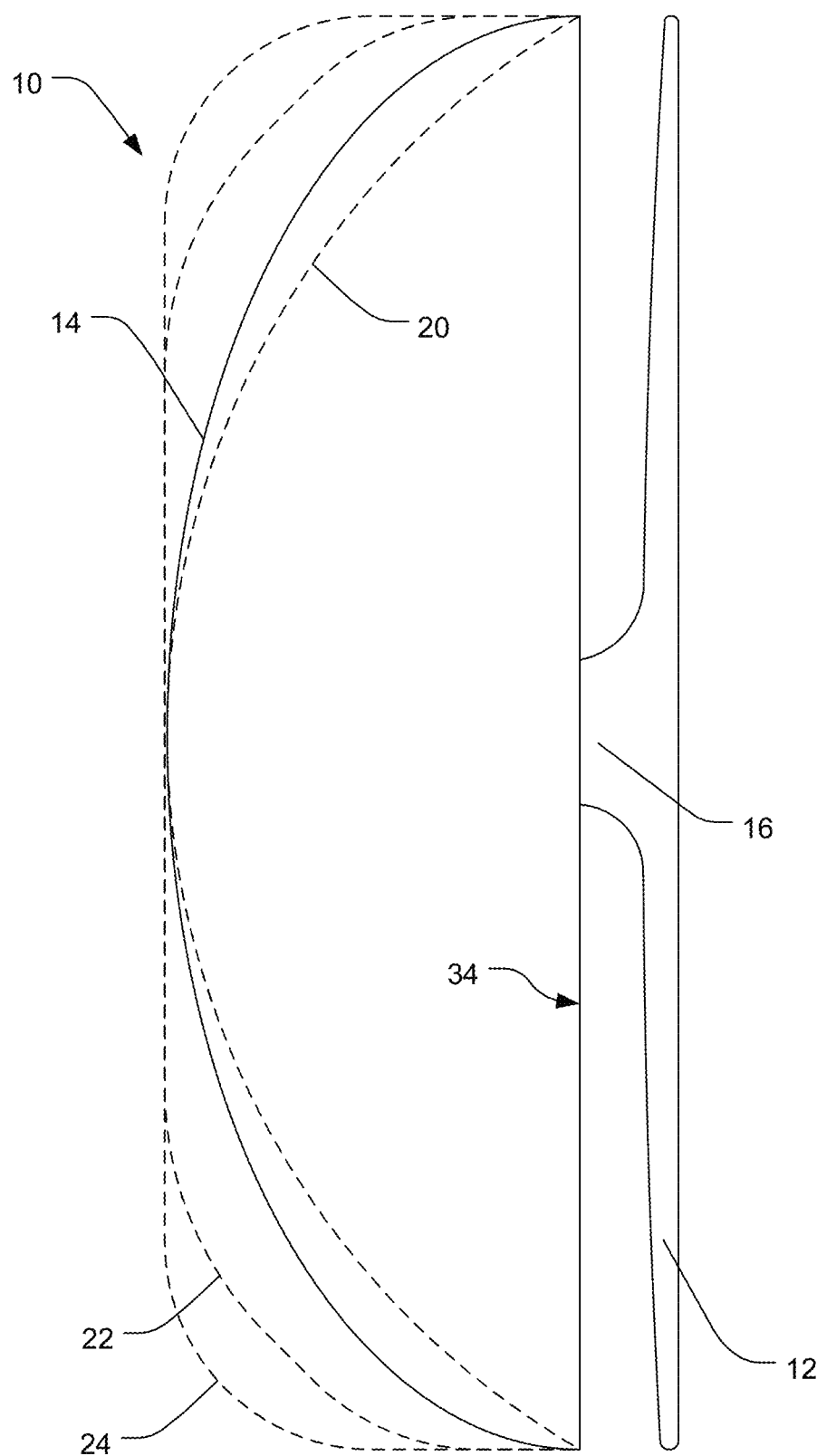
FIG. 3 shows a side view of embodiments of a device for storing an electrical cord of an appliance.

As may be seen in FIGS. 1 and 2, some embodiments of the dome 14 extend radially outwardly away from the post 16 while generally curving back toward the base 12 or toward an imaginary plane located at the intersection of the base 12 and the post 16 and generally or substantially normal to the post 16. In the embodiment of FIGS. 1 and 2, the imaginary plane is substantially equivalent to a planar surface of the bottom of the base 12 itself. While FIG. 2 shows one example of a manner in which the dome 14 curves back toward the base 12 or the plane of the base 12, the illustrated shape should not be understood as being anything other than illustrative of one possible shape of the dome 14. Indeed, FIG. 3 represents a side view of the device 10 substantially similar to the view of FIG. 2, but also illustrating possible alternate shapes of the dome 14, namely, a first alternate shape 20, a second alternate shape 22, and a third alternate shape 24. It should be understood that other shapes than the particular shapes illustrated in FIG. 3 or any of the FIGS. could be used for the dome 14. For instance, some embodiments of the dome comprise a pyramidal shape, a conical shape, a polygonal shape, a framework (e.g., members extending out from the post), a webbed shape, a parabolic shape, a planar shape, and/or any other suitable shape.

In accordance with some embodiments, the base 12 is adapted to be affixed to a surface of an appliance. In some such embodiments, the affixation of the base 12 to the appliance is substantially permanent (i.e., not intended to be readily reversible). In some other embodiments, the base is configured to be more-or-less readily reversible (or selectively detachable from the electrical appliance). In one example of a reversible attachment, one component of a hook-and-loop fastener is affixed (e.g., using an adhesive, sewing, welding, be integrally formed with, and/or any other suitable attachment means compatible with the material of the base 12) to the base 12 and the other component is affixed (e.g., using adhesive or other attachment means compatible with the material of the surface of the appliance) to the appliance. Then, the device 10 is positioned over the surface of the appliance and attached using the hook-and-loop fastener. In some other embodiments, however, the base comprises one or more suction cups that allow it to selectively couple to and/or decouple from an electrical device. In still other embodiments, the base further comprises one or more pressure sensitive adhesives (e.g., that are used with or without suction cups) that are used to selectively couple the device to an electrical appliance.

Figure 4:
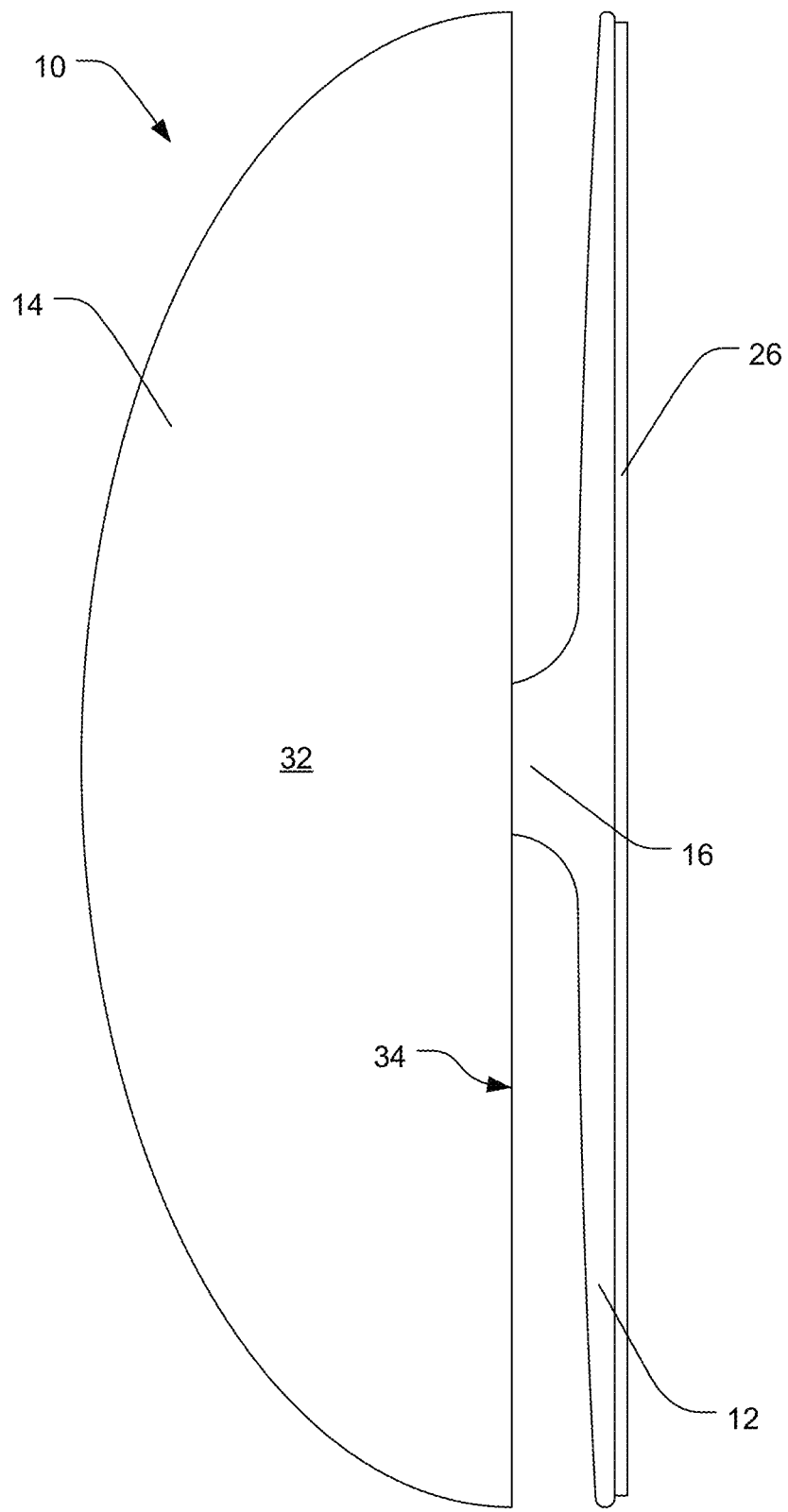
FIG. 4 shows a side view of one embodiment of a device for storing an electrical cord of an appliance.

In an example of substantially permanent affixation, an epoxy, glue, chemical weld, double-sided tape, and/or any other suitable adhesive is applied to the appliance and/or the appliance-contacting surface 18 of the base 12, then the device 10 is positioned as desired near the appliance and then brought to contact the appliance such that the adhesive bonds the device 10 to the appliance. As another example, as illustrated in FIG. 4, an adhesive material 26 (not necessarily shown to scale as to either placement or thickness) is pre-applied to the base 12 such that an end user need only remove a protective covering from the adhesive material 26 to expose it, then the device 10 is positioned and placed on the appliance as previously discussed.

In some embodiments, the adhesive material 26 comprises a material such as a two-sided adhesive pad. In some embodiments, the adhesive material 26 is provided in multiple segments that are individually exposed prior to placement of the device 10. In some embodiments, the device 10 is sold (or otherwise provided) as a kit with one or more types of adhesive material 26 provided for selection by the user depending on the intended use (e.g., a material of the surface of the appliance, a texture of a surface of the appliance, an expected maximum or minimum temperature of the surface of the appliance, etc.). In general, the material of the base 12 and of the adhesive material 26 (or other affixation mechanism used) is selected so as to be capable of enduring anticipated maximum and minimum temperatures of the surface of the appliance for an anticipated lifetime of the device 10. Otherwise, the specific materials of the base 12 and the adhesive material 26 or their equivalents are not limited other than as desired to provide a desired flexibility to the base 12 and the adhesive material 26 so as to permit tolerance of heat while permitting a desired amount of conformance to the underlying surface of the appliance.

In some embodiments, the dome 14 is optionally manufactured of (or otherwise comprises) similar heat-tolerant and/or flexible materials, taking into account the fact that the dome 14 is not necessarily directly contacting the surface of the appliance and therefore may see smaller deviations in expected experienced temperatures. In this regard, having the dome 14 be manufactured of a flexible material (e.g., a rubbery material, such as silicone, silicone-containing materials, rubber, plastic, and/or any other suitable flexible material) allows the dome 14 to flex and move as an electrical cord is wound around the post 16. Additionally, the dome 14 being formed of a flexible material allows some embodiments of the dome 14 to be popped out and/or inverted, as illustrated in FIG. 5, to permit easier removal of the electrical cord from around the post 16.

Figure 5:
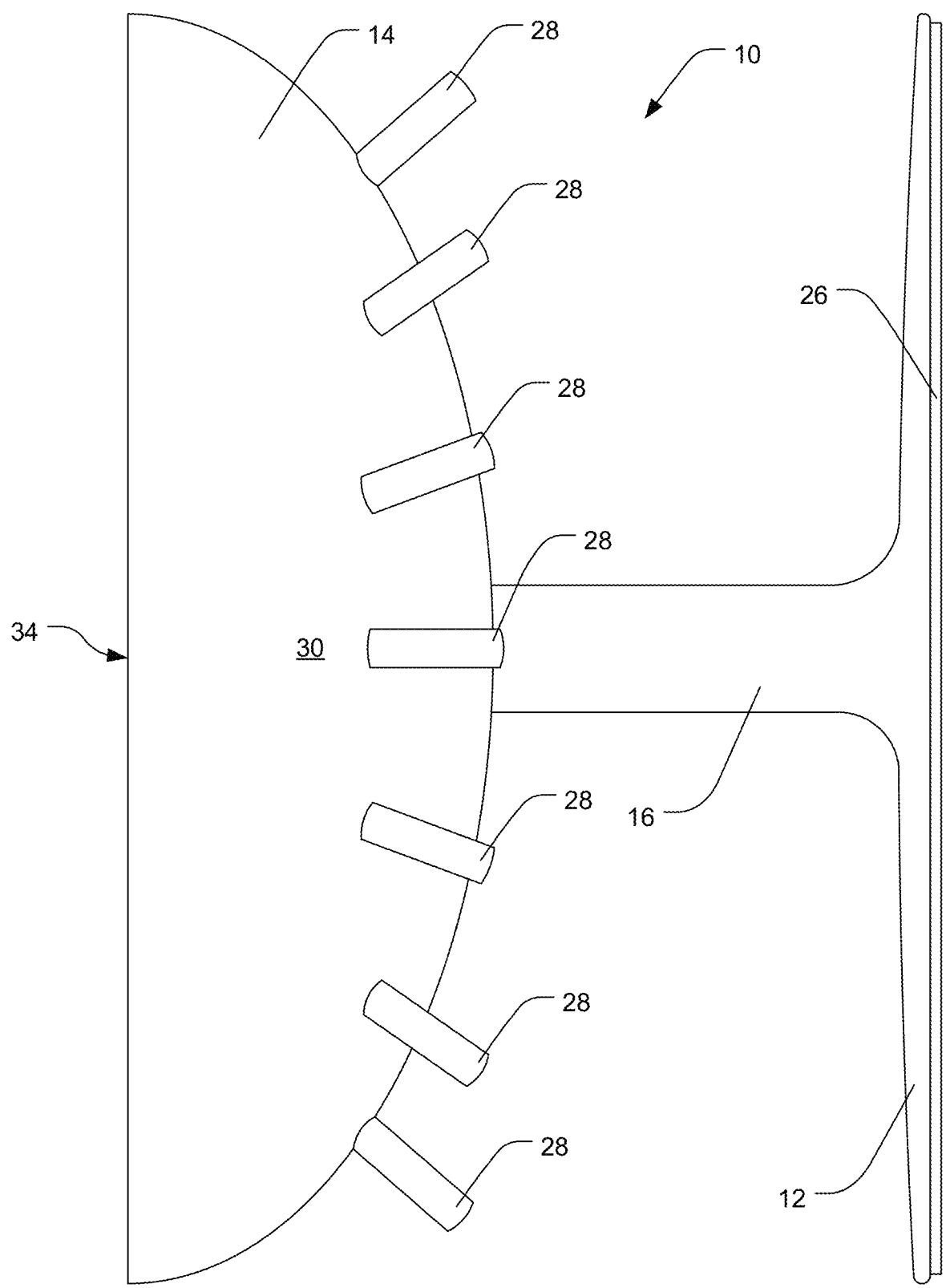
FIG. 5 shows a side view of one embodiment of a device for storing an electrical cord of an appliance.

In the embodiment of FIG. 5 (also illustrated in the cross-sectional view of FIG. 6 in a non-inverted position), the dome 14 is shown as having a number of nubs 28 (or any other suitable protrusions) extending from an inner surface 30 (and/or any other suitable portion) of the dome 14. While FIG. 5 shows one possible shape, placement, and number of the nubs 28, this embodiment is intended to be illustrative only, and is not intended to be limiting of embodiments of the invention. Some embodiments have no nubs 28, while other embodiments have differently sized, shaped, or placed nubs 28 or different numbers of nubs 28, as illustrated by the cross-sectional views of FIGS. 7 and 8, which show differing numbers of nubs 28 in two embodiments.

In some embodiments where the nubs 28 are present, the nubs 28 are formed with the dome 14, and are optionally of a similar or identical material to the dome 14. In alternate embodiments, the nubs 28 are still formed with the dome 14, but are of a more-flexible material than the dome, so as to be particularly able to flex as the electrical cord is wound about the post 16 without breaking. In alternate embodiments, the nubs 28 are separately formed and are then attached to the dome 14. Embodiments of the invention embrace any method for forming the nubs 28 and for ensuring that the nubs 28 are securely affixed to the inner surface 30 of the dome 14.

As discussed, in some embodiments, the dome 14 lacks any nubs 28. Accordingly, in some such embodiments the inner surface 30 of the dome 14 is substantially smooth, similar to a smoothness of an outer surface 32 of the dome 14, as illustrated in FIG. 4. In alternate embodiments, the inner surface 30 of the dome is neither smooth nor contains nubs 28, but is otherwise formed so as to provide increased friction or retention of the electrical cord against unintended unwinding (e.g., the inner surface is textured, knurled, bumpy, ridged, comprises stippling, and/or otherwise comprises a non-smooth surface). Embodiments of the invention therefore embrace any surface treatment or texture of the inner surface 30.

Similarly, while FIGS. 1-4 illustrate the outer surface 32 of the dome 14 as being substantially smooth, such is not a required feature of all embodiments of the invention. Indeed, some embodiments of the invention have raised portions of the outer surface 32 for decoration or to facilitate grip, and the outer surface 32 of some embodiments is adorned with flush branding or branding formed by surface variation (e.g., embossed branding). Accordingly, both the inner and outer surfaces of the dome 14 are varied between embodiments.

Returning to FIG. 5, this drawing illustrates how inversion or popping out of the dome 14 allows the user to more-readily access and unwind the electrical cord from around some embodiments of the post 16. This view and the cross-sectional view of FIG. 6 also illustrates how the post 16 extends from a first end affixed to or formed with the base 12 to a second end affixed to (or formed with) the dome 14. While these FIGS. illustrate one embodiment of the post 14, other embodiments are used in alternate embodiments of the invention. By way of example only, the diameter, length, and shape of the post 14 is varied from embodiment to embodiment as desired to achieve desired cord-wrapping characteristics. In the illustrated embodiment, the post 16 is generally cylindrical (other than tapering slightly proximate either the base 12 or the dome 14), but in alternate embodiments, the post 16 has a polygonal cross section (e.g., having a cross-sectional shape that is substantially square, triangular, pentagonal, hexagonal, elliptical, and/or any other suitable shape).

Figure 6:
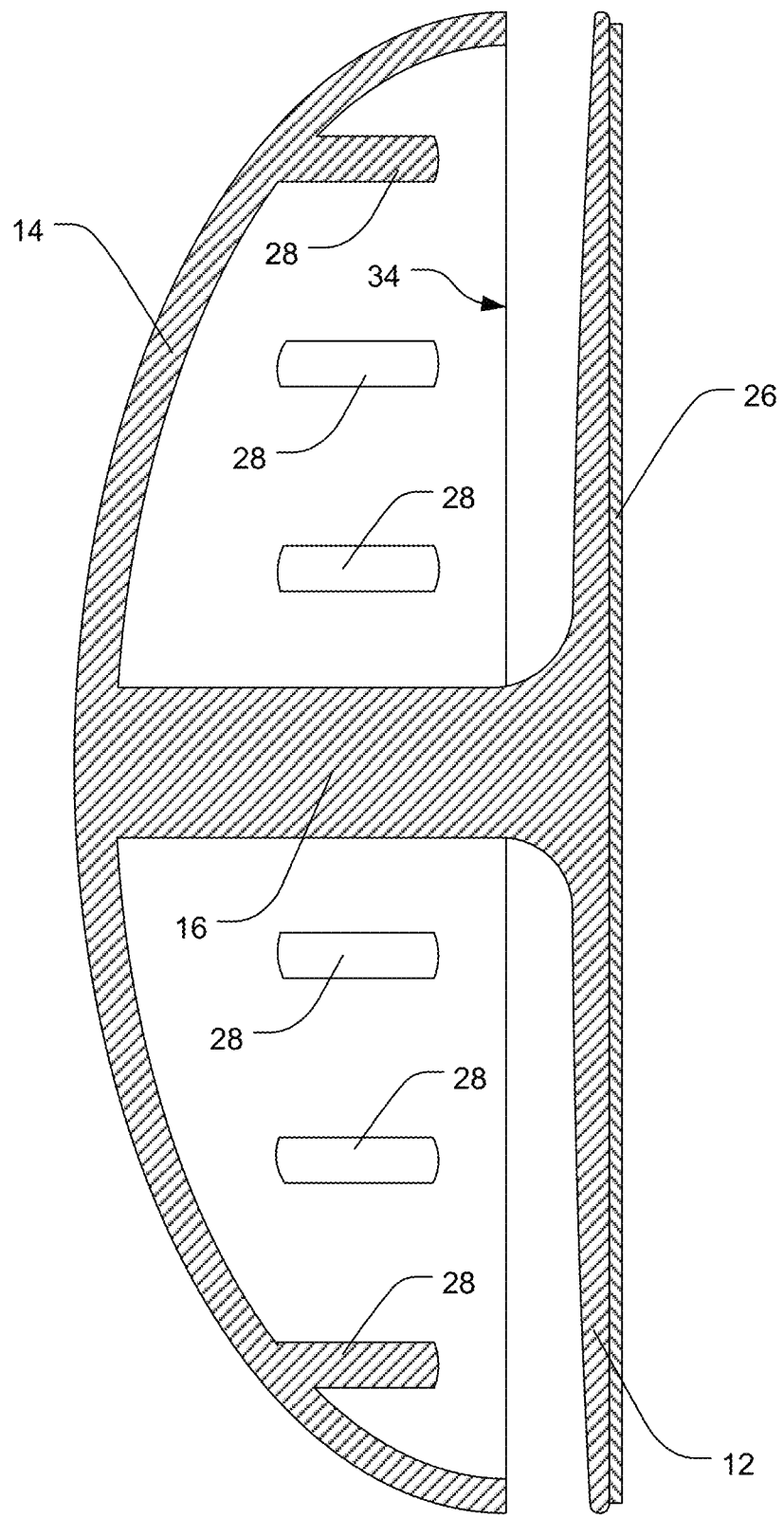
FIG. 6 shows a side cross-sectional view of one embodiment of a device for storing an electrical cord of an appliance.
Figure 7:
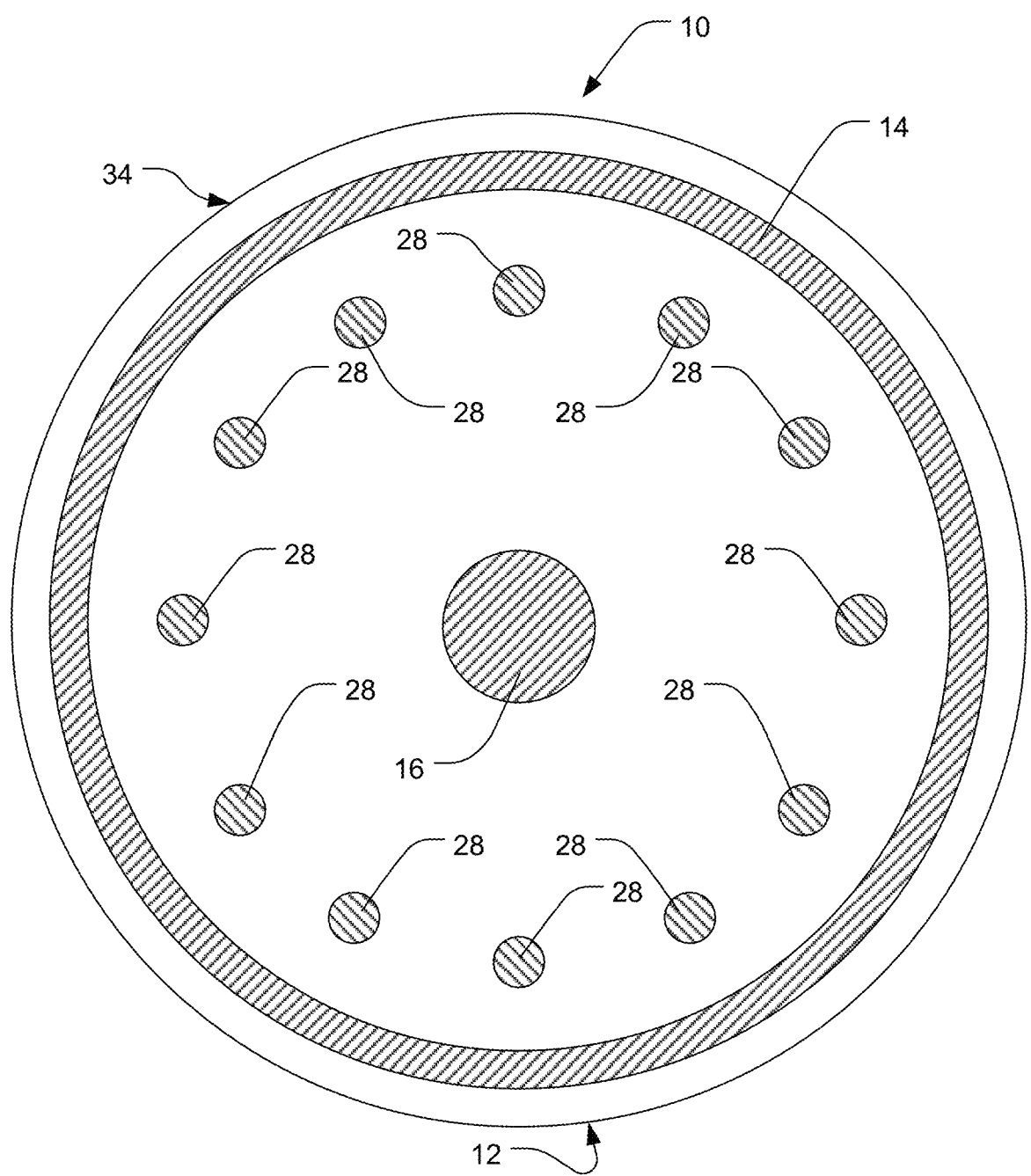
FIG. 7 shows a top cross-sectional view of one embodiment of a device for storing an electrical cord of an appliance.
Figure 8:
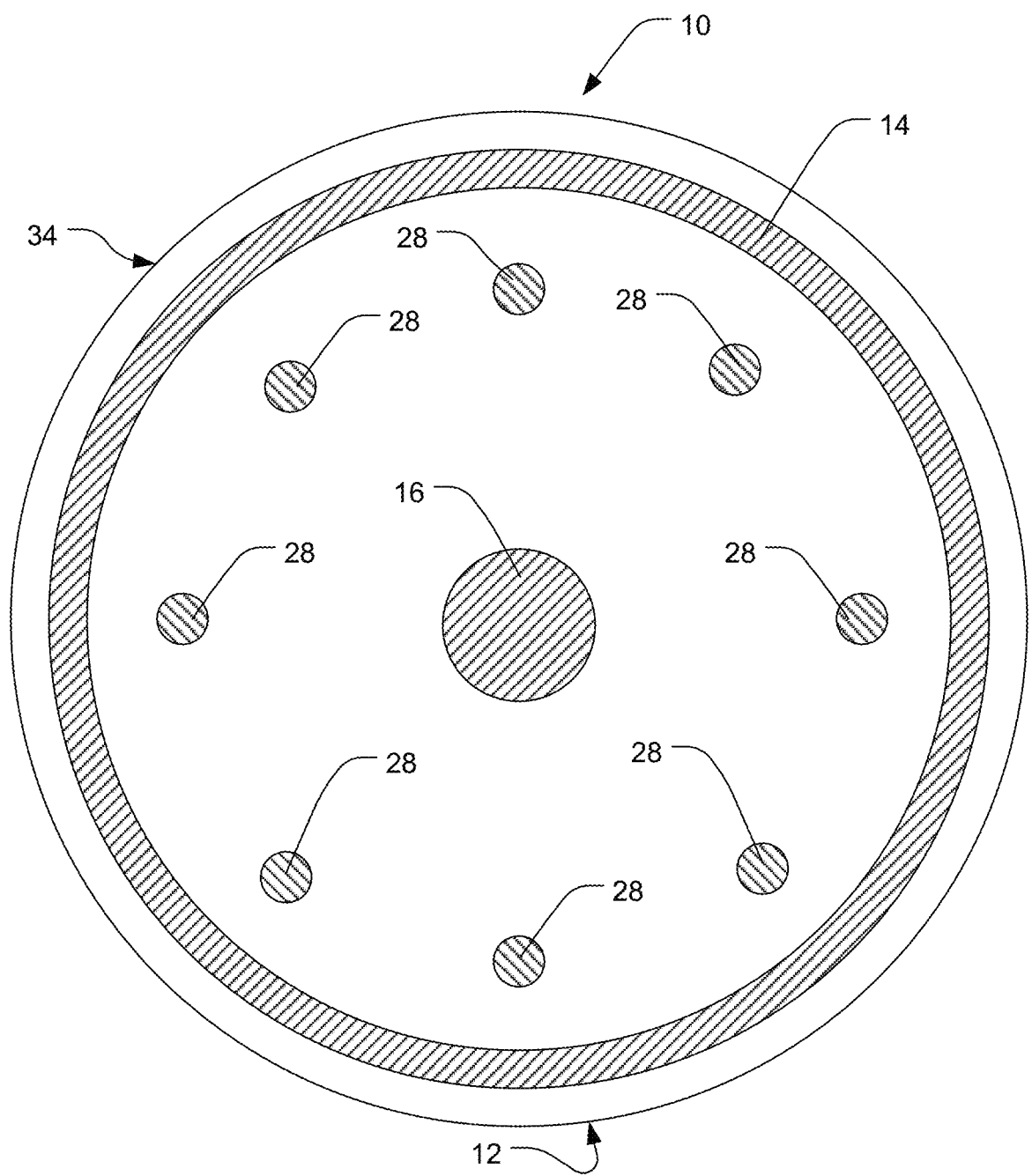
FIG. 8 shows a top cross-sectional view of one embodiment of a device for storing an electrical cord of an appliance.

In accordance with some embodiments, when the dome 14 is popped out as shown in FIG. 5, the nubs 28 also generally pop out of the way of unwinding the electrical cord from around the post 16. As shown in the cross-sectional view of FIG. 6, however, when the dome 14 is in its normal state, some embodiments of the nubs 28 extend into the volume defined between the base 12 and the dome 14, so as to contact the electrical cord and prevent or reduce unintended unwinding thereof. The cross-sectional view of FIG. 6 is taken through the post 16 and parallel thereto, while the cross-sectional view of alternate embodiments of FIGS. 7 and 8 is taken through the post 16 but generally perpendicular thereto and looking toward the base 12.

Figure 9:
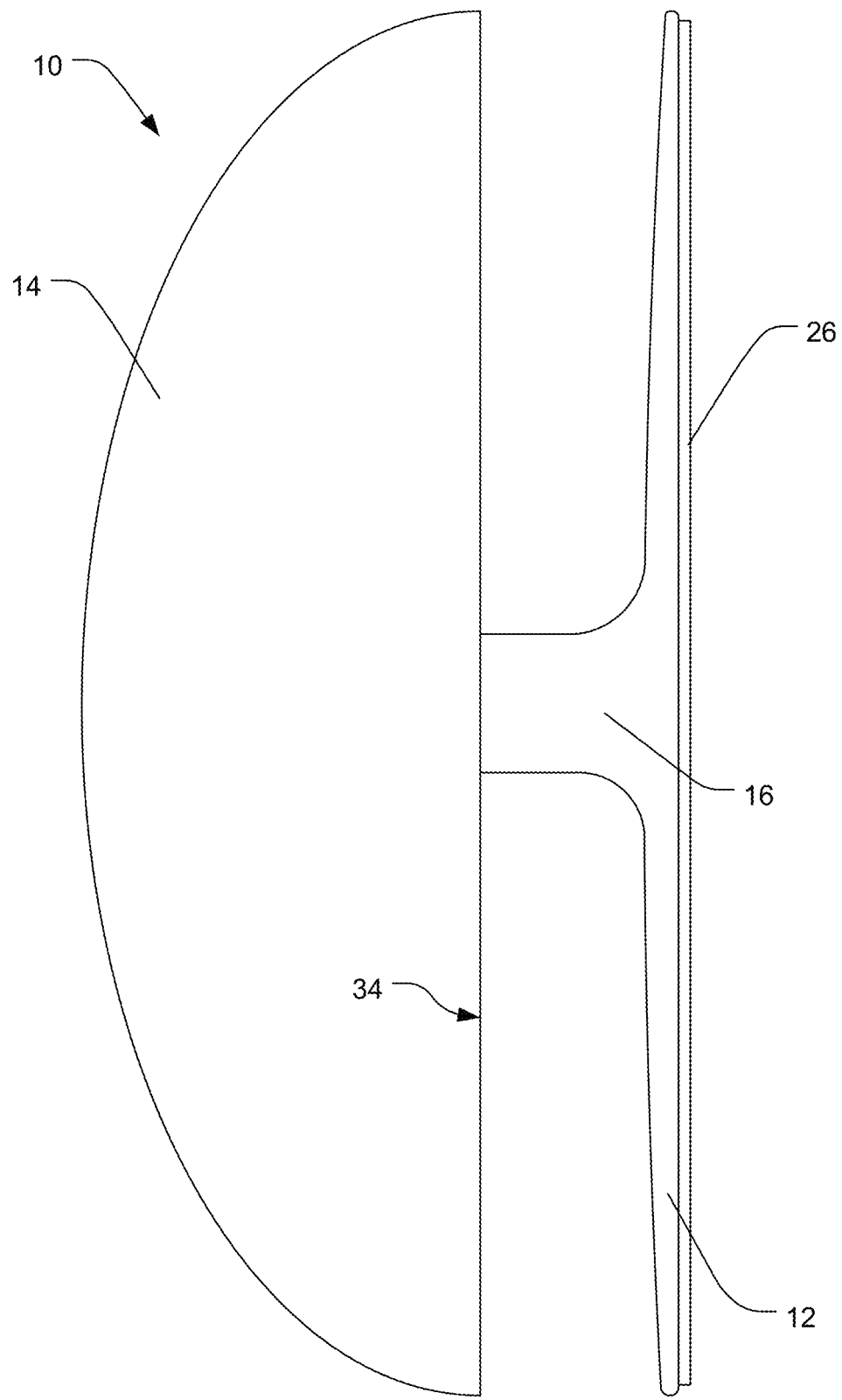
FIG. 9 shows a side view of one embodiment of a device for storing an electrical cord of an appliance.
Figure 10:
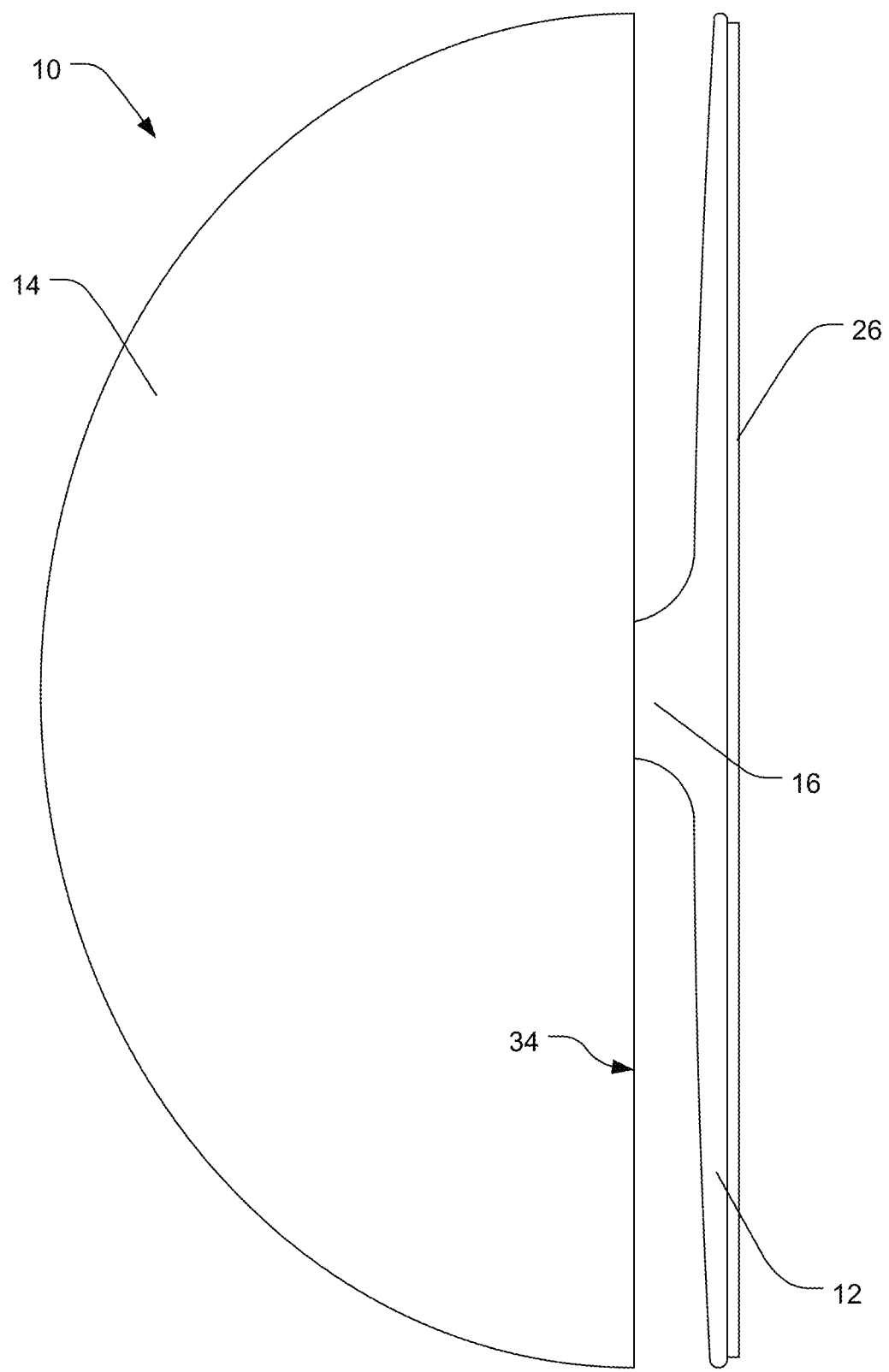
FIG. 10 shows a side view of one embodiment of a device for storing an electrical cord of an appliance.

In accordance with some embodiments, the dome 14 has one or more edges (e.g., edge 34) that are generally radially away from the post 16 and that are also generally closer to the base 12 than is the center of the dome 14, as is illustrated in the drawings. In some such embodiments, the edge 34 of the dome 14 defines a space between the dome 14 and the base 12 (or between the dome 14 and the appliance, when the device 10 is affixed to an appliance), which space accepts or accommodates the appliance's electrical cord as the cord is wound around the post 16. This space may be of any desired dimension, and may be varied depending on factor such as the thickness, length, or stiffness of the electrical cord. By way of example, FIGS. 2 and 9 illustrate two embodiments having a different space between the edge 34 of the dome 14 and the base 12. As another example, FIG. 10 illustrates an embodiment with a larger dome 14 (potentially to accept a longer length of electrical cord), but still with a more-narrow gap or space between the dome 14 and the base 12 than the version of FIG. 9.

As discussed, some embodiments of the base 12 serve to provide an area that can be anchored to the surface of the appliance. The base 12 can be any desired size, shape, and dimensions (and/or comprise any other suitable feature that allows it) to accomplish this purpose. In the embodiments of FIGS. 1-10, the base 12 and the dome 14 are both generally circular, and both have a generally similar width (or radial distance of maximum extent from the post 16). This, however, is not a requirement of all embodiments of the invention. In some embodiments, the base 12 extends farther from the post 16 than does the dome 14, and in other embodiments, the dome 14 extends farther from the post 16 than does the base 12. The base 12 is simply sized to provide a desired amount of adhesion and/or cord retention properties, and the dome 14 is sized to receive a desired length of electrical cord therein in the volume between the dome 14 and the base 12 (or the appliance).

Figure 11:
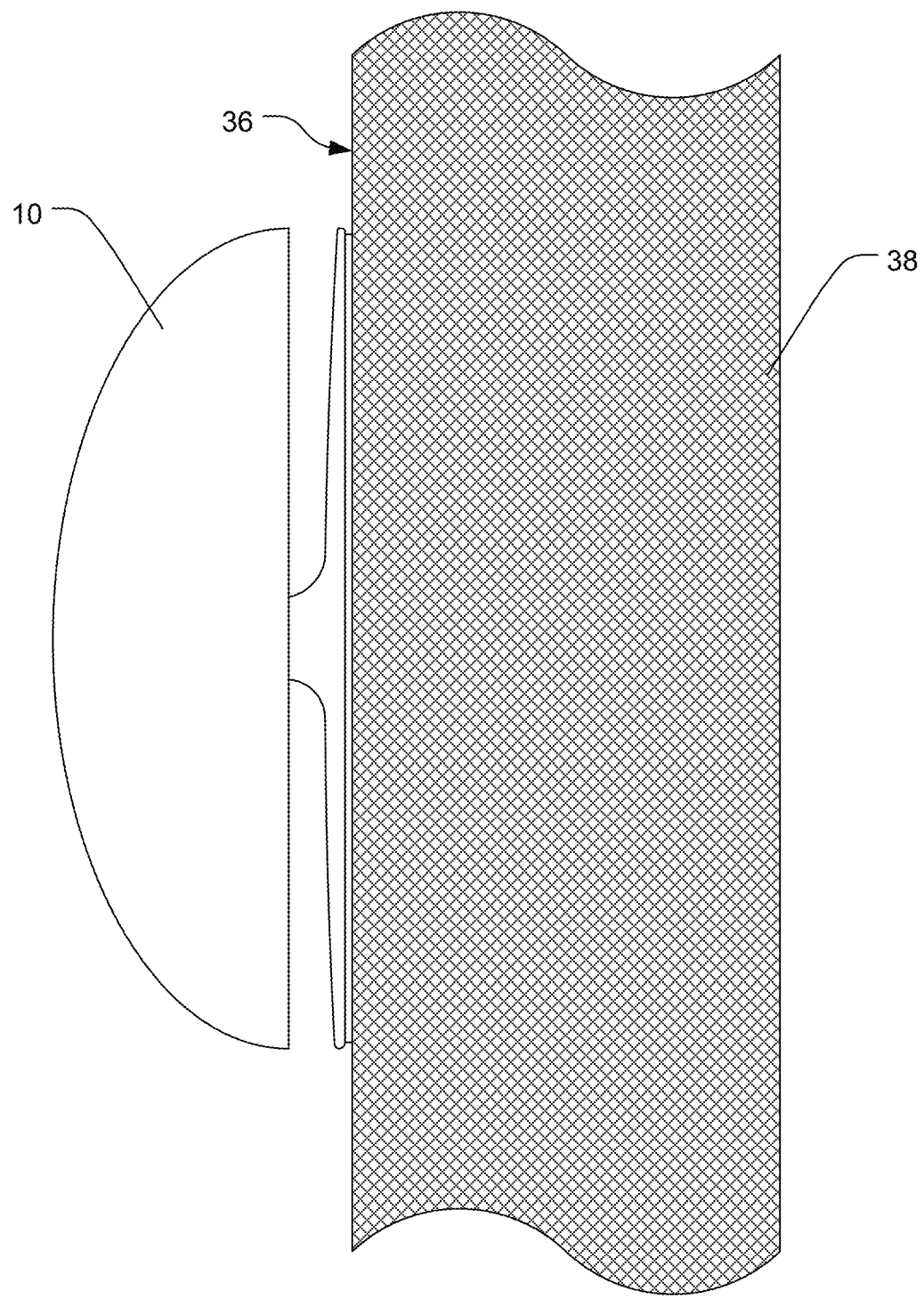
FIG. 11 shows a side view of one embodiment of a device for storing an electrical cord of an appliance affixed to an appliance.
Figure 12:
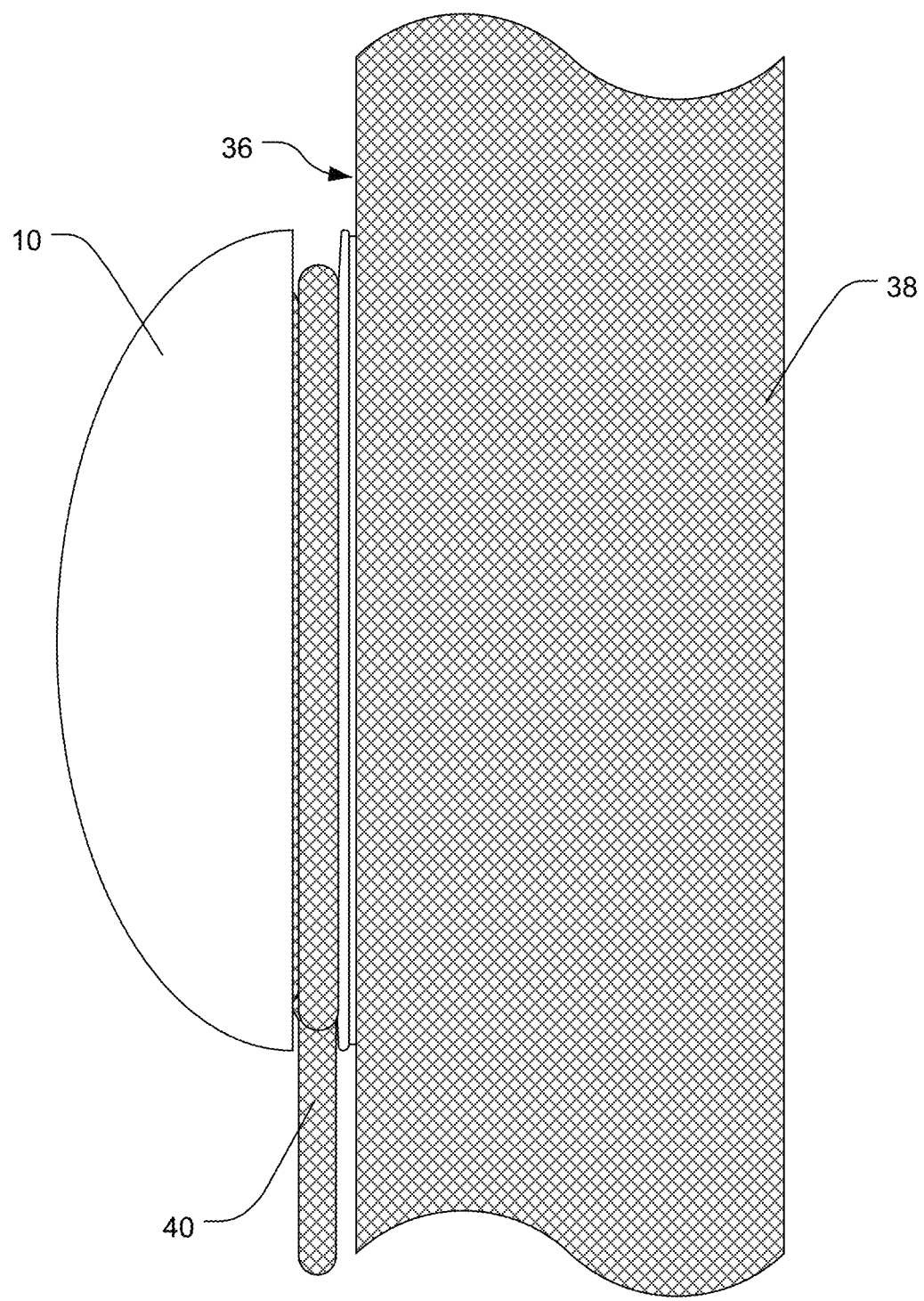
FIG. 12 shows a side view of one embodiment of a device for storing an electrical cord of an appliance affixed to an appliance with an electrical cord wound thereon.

FIG. 11 illustrates one embodiment of the device 10 affixed to a surface 36 of an appliance 38. For purposes of illustration, only a portion of the appliance 38 is shown, but it should be understood that the appliance 38 can be any appliance or other electrical device having an electrical cord for which storage of the cord is desired. FIG. 12 shows the device 10 affixed to the surface 36 of the appliance 38, with an electrical cord 40 wound thereon. If the electrical cord 40 is permanently attached to the appliance 38, a portion of the electrical cord 40 extends from the appliance 38 to the device 10, and another portion of the electrical cord 40 may extend from the device 10, such as to an electrical outlet, to permit grasping when unwinding is desired, or just to leave a portion of the electrical cord 40 exposed for use.

Figure 13:
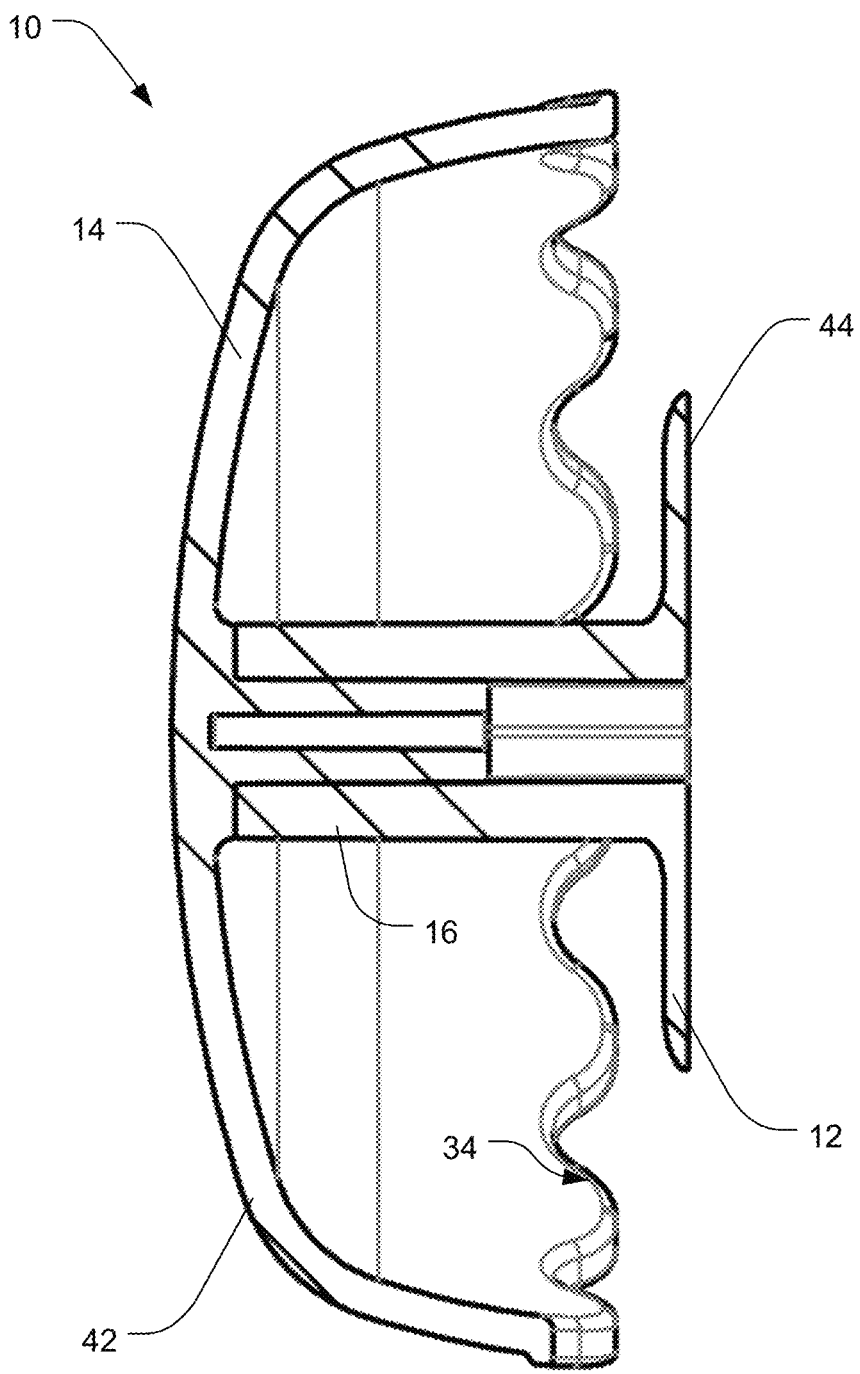
FIG. 13 shows a cross-sectional view of one embodiment of a device for storing an electrical cord of an appliance.
Figure 14:
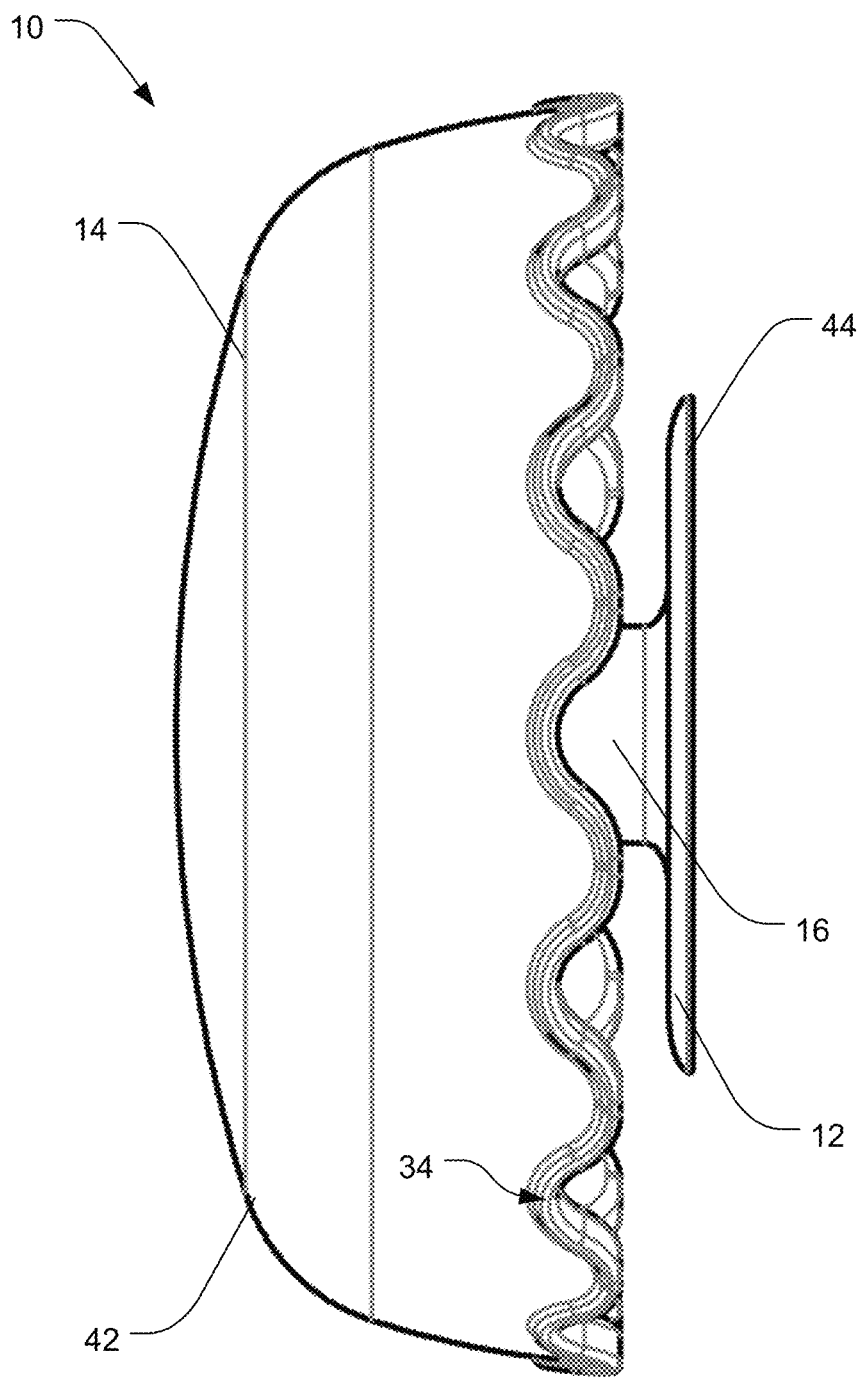
FIG. 14 shows a side view of one embodiment of a device for storing an electrical cord of an appliance.
Figure 15:
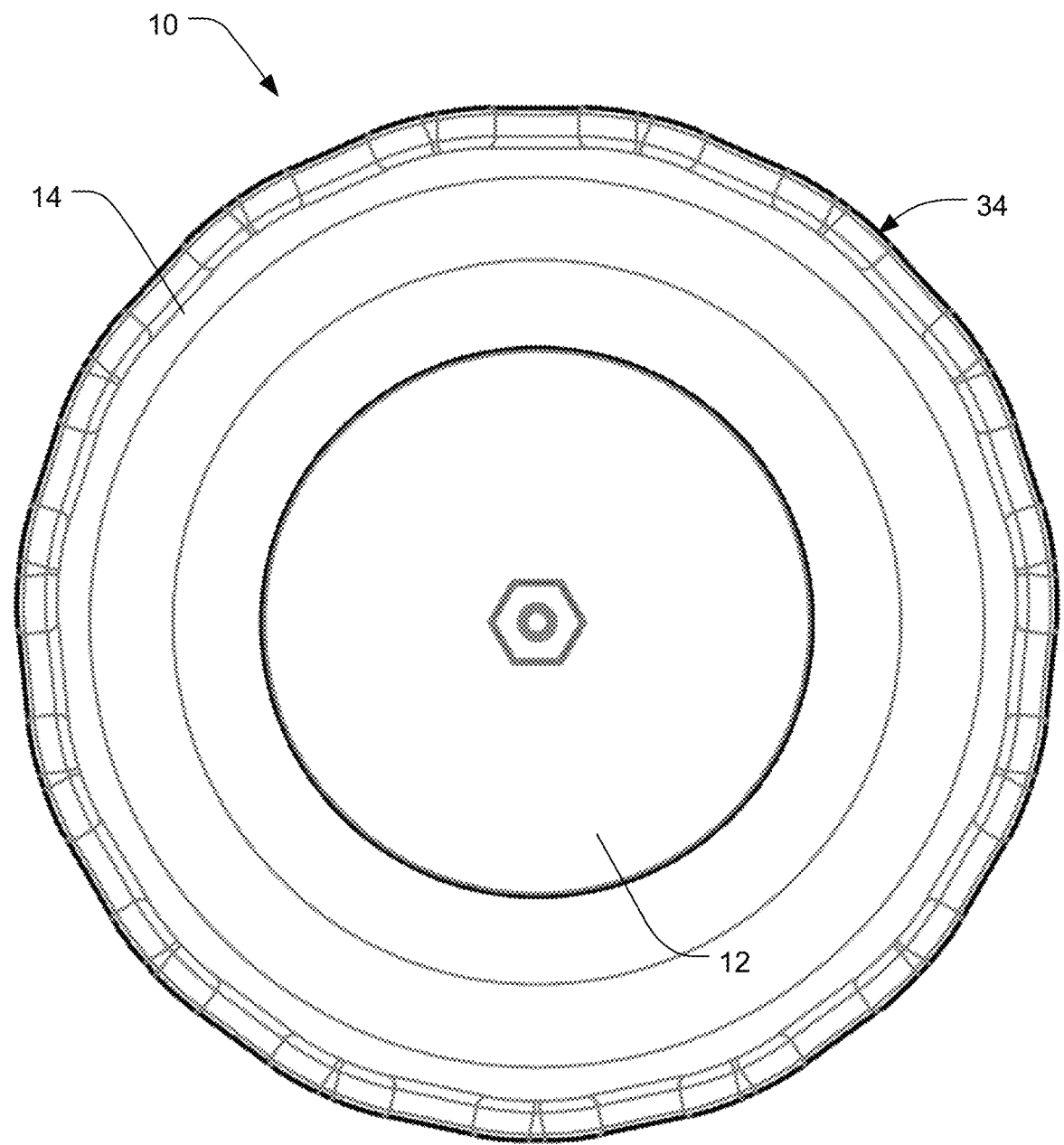
FIG. 15 shows a bottom view of one embodiment of a device for storing an electrical cord of an appliance.
Figure 16:
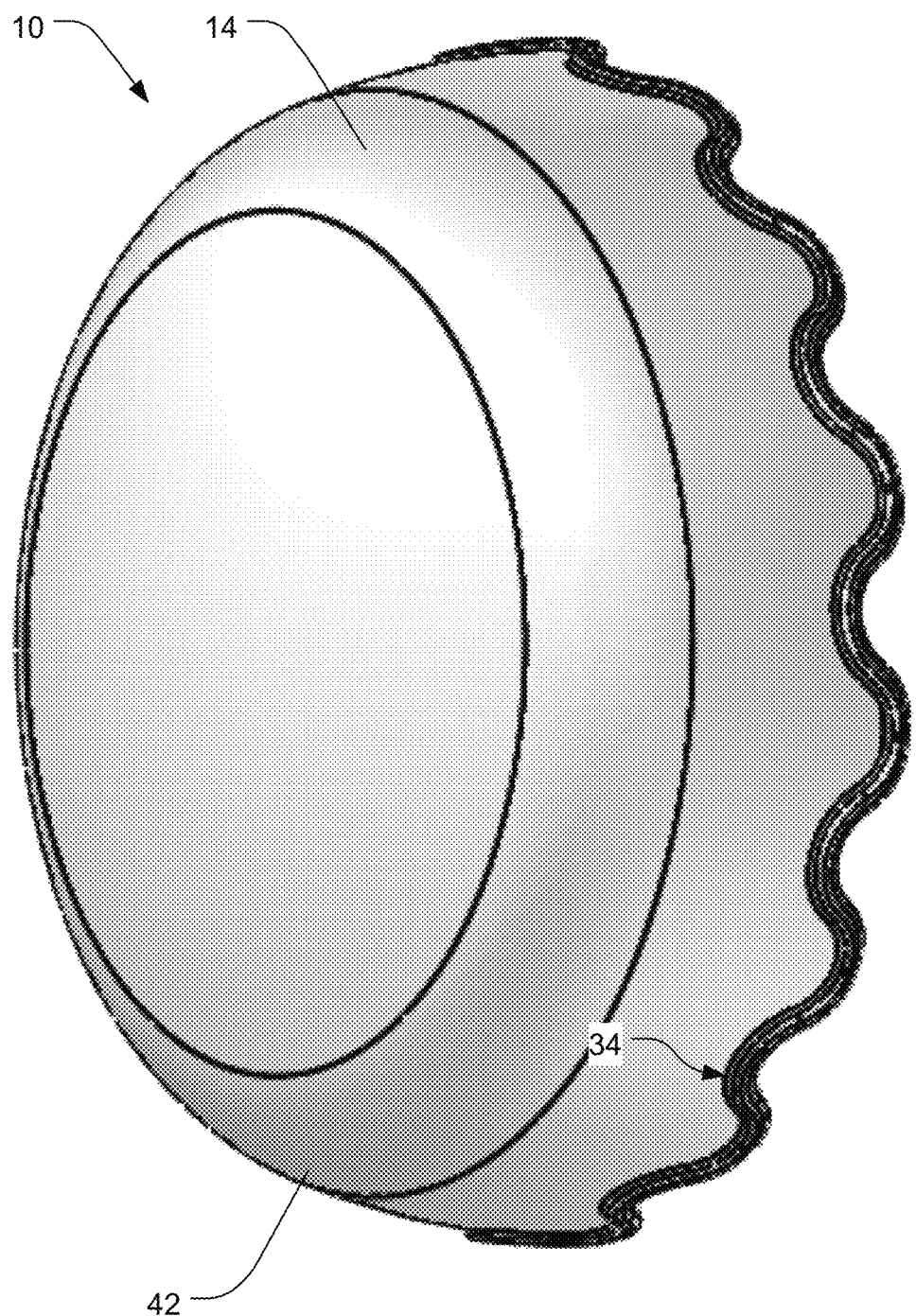
FIG. 16 shows a perspective view of one embodiment of a device for storing an electrical cord of an appliance.
Figure 17:
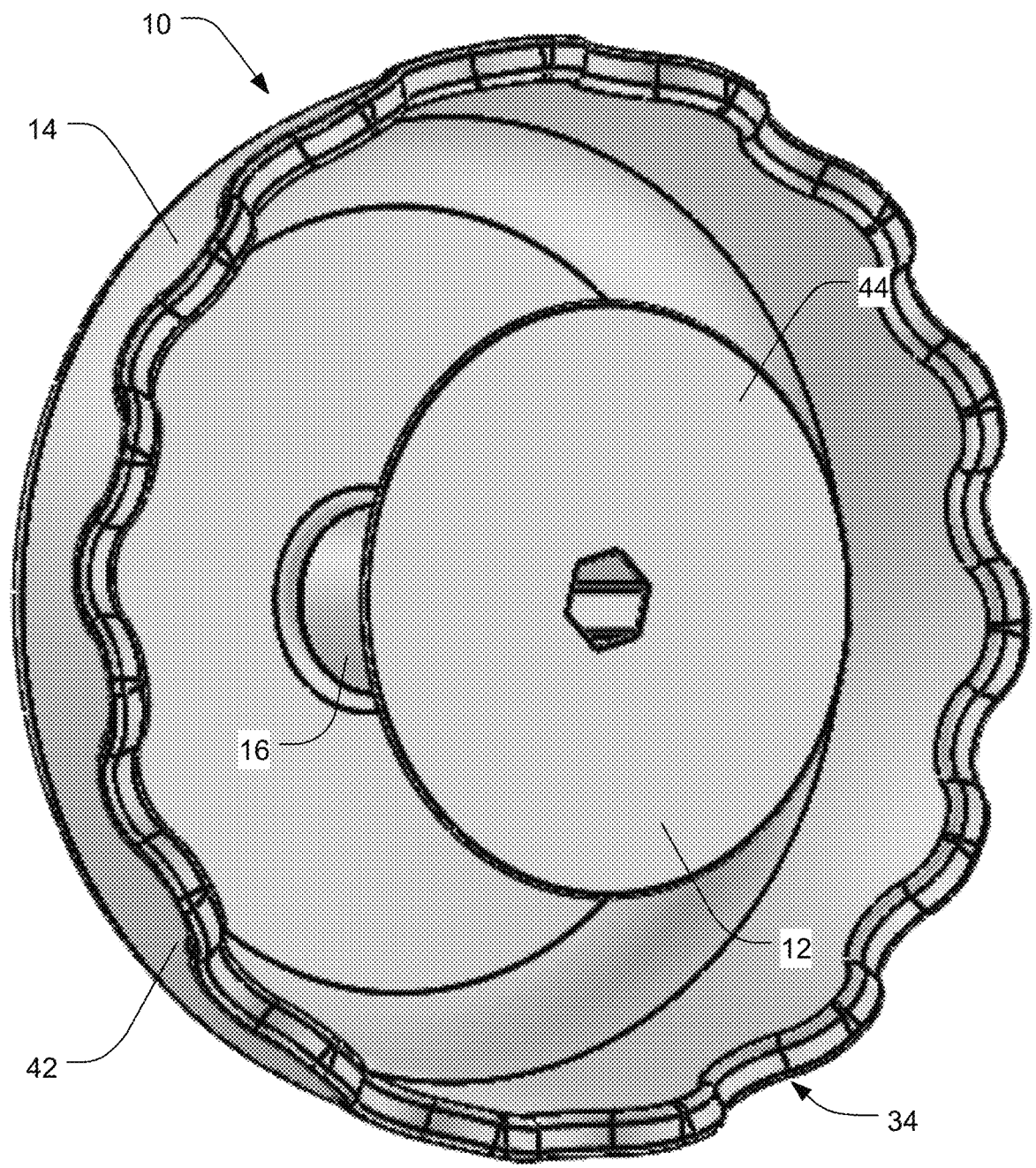
FIG. 17 shows a perspective bottom view of one embodiment of a device for storing an electrical cord of an appliance.
Figure 18:
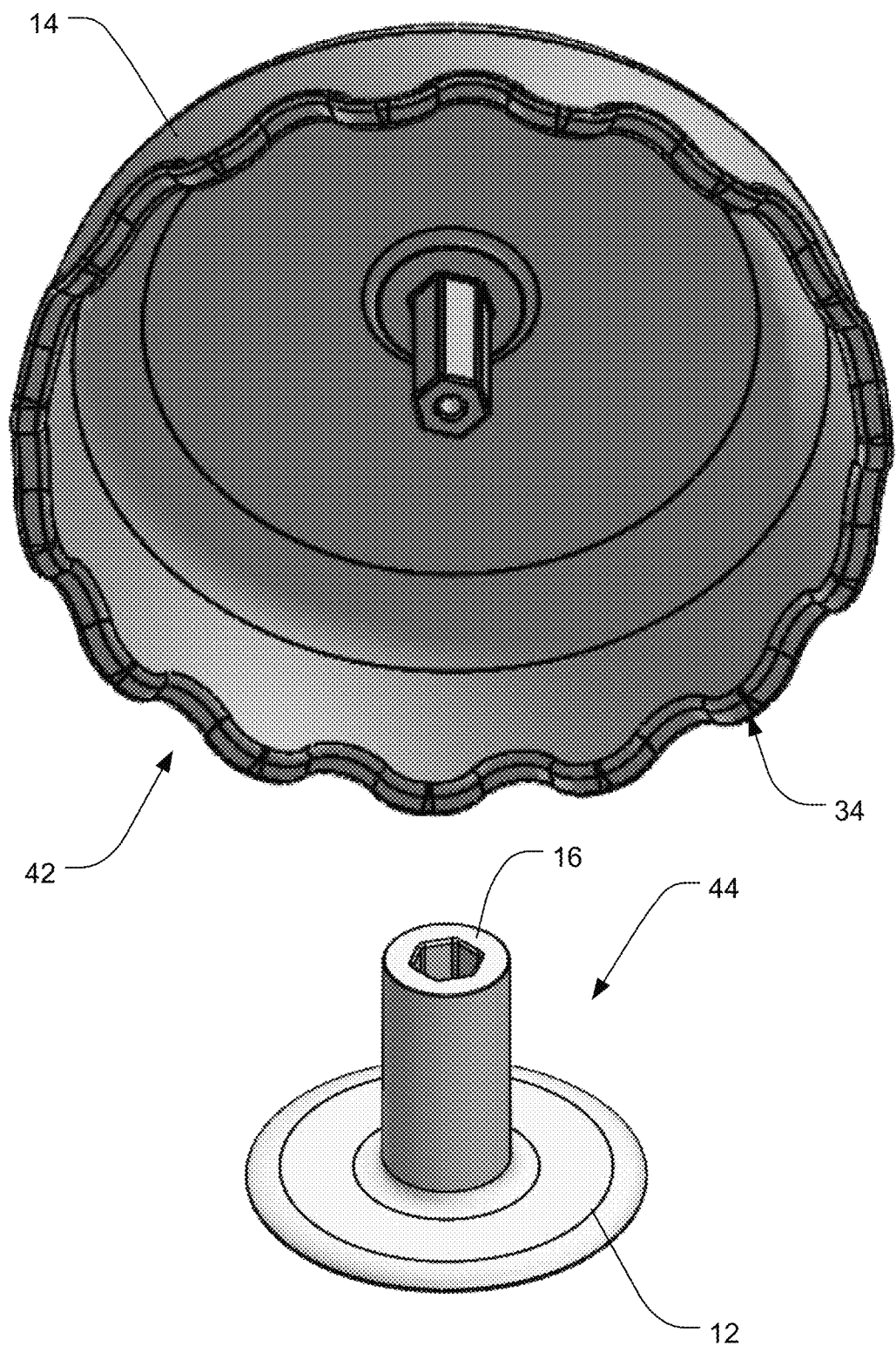
FIG. 18 shows a perspective view of two components of one embodiment of a device for storing an electrical cord of an appliance.

FIGS. 13-18 illustrate various views of an alternate embodiment of the device 10. FIG. 13 is a cross-sectional view of this embodiment of the device 10, FIG. 14 provides a side view, FIG. 15 shows a bottom view (looking at the base 12 being closest to the viewer), FIG. 16 shows a perspective view, FIG. 17 shows a bottom perspective view, and FIG. 18 shows a perspective view of the parts of the device 10. (See also FIGS. 22-30). These views show that in this embodiment, the device 10 is formed of two sections, a dome section 42 formed as the dome 14 and part of the post 16, and a base section 44 formed as the base 12 and part of the post 16. The dome section 42 and the base section 44 are attached to each other by any desirable means, such as by way of a bolt or screw, by a friction fit, by an adhesive, by a threaded fit between parts, a mechanical engagement, an adhesive, and/or in any other suitable manner. In this embodiment, the edge 34 of the dome 14 is scalloped (or comprises one or more scalloped portions), thus providing an alternate mechanism by which the electrical cord is retained within the dome 14, thereby preventing or reducing unintended unwinding of the electrical cord from the device 10.

Figure 19:
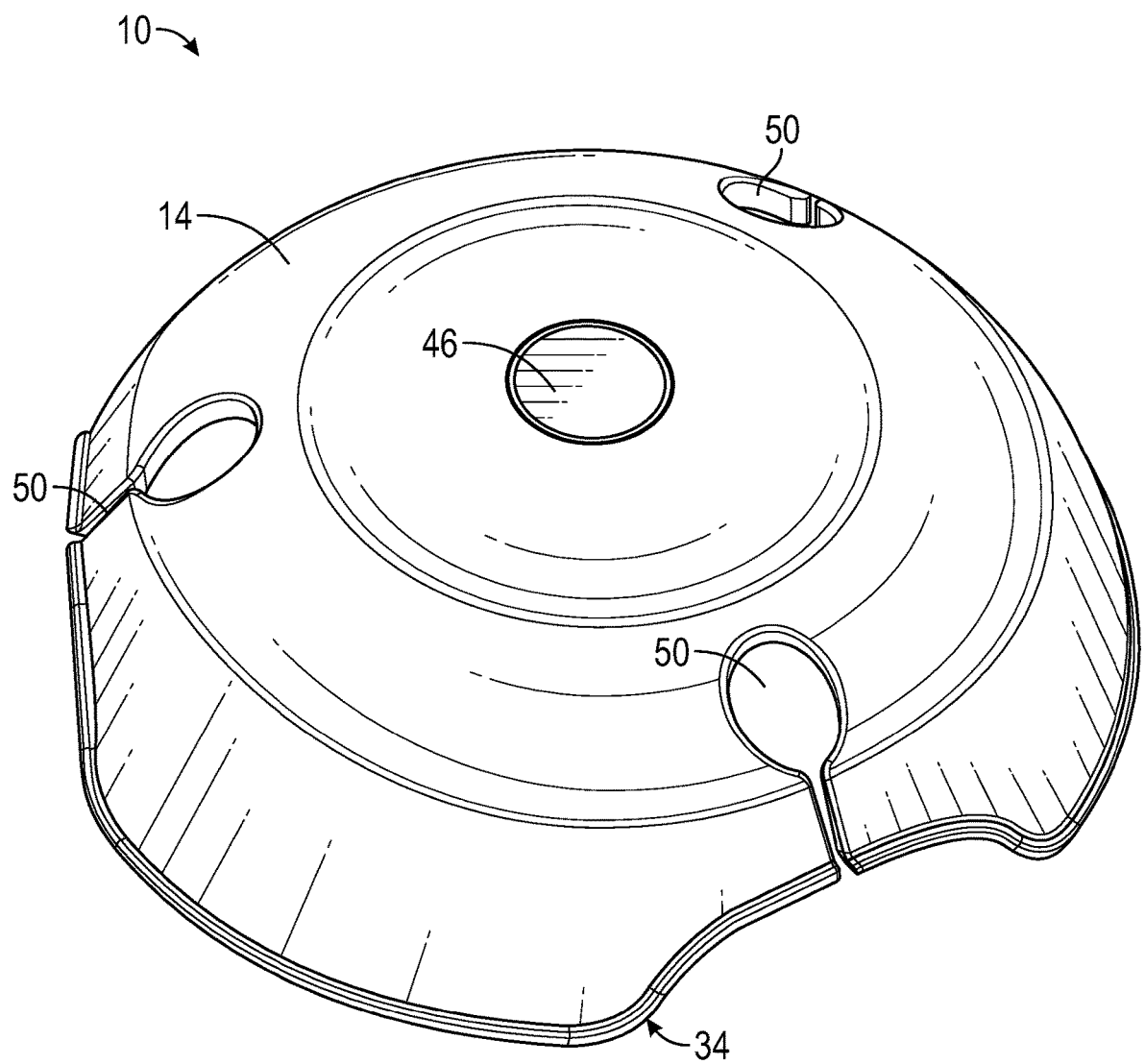
FIG. 19 shows a perspective view of one embodiment of a device for storing an electrical cord of an appliance.
Figure 20:
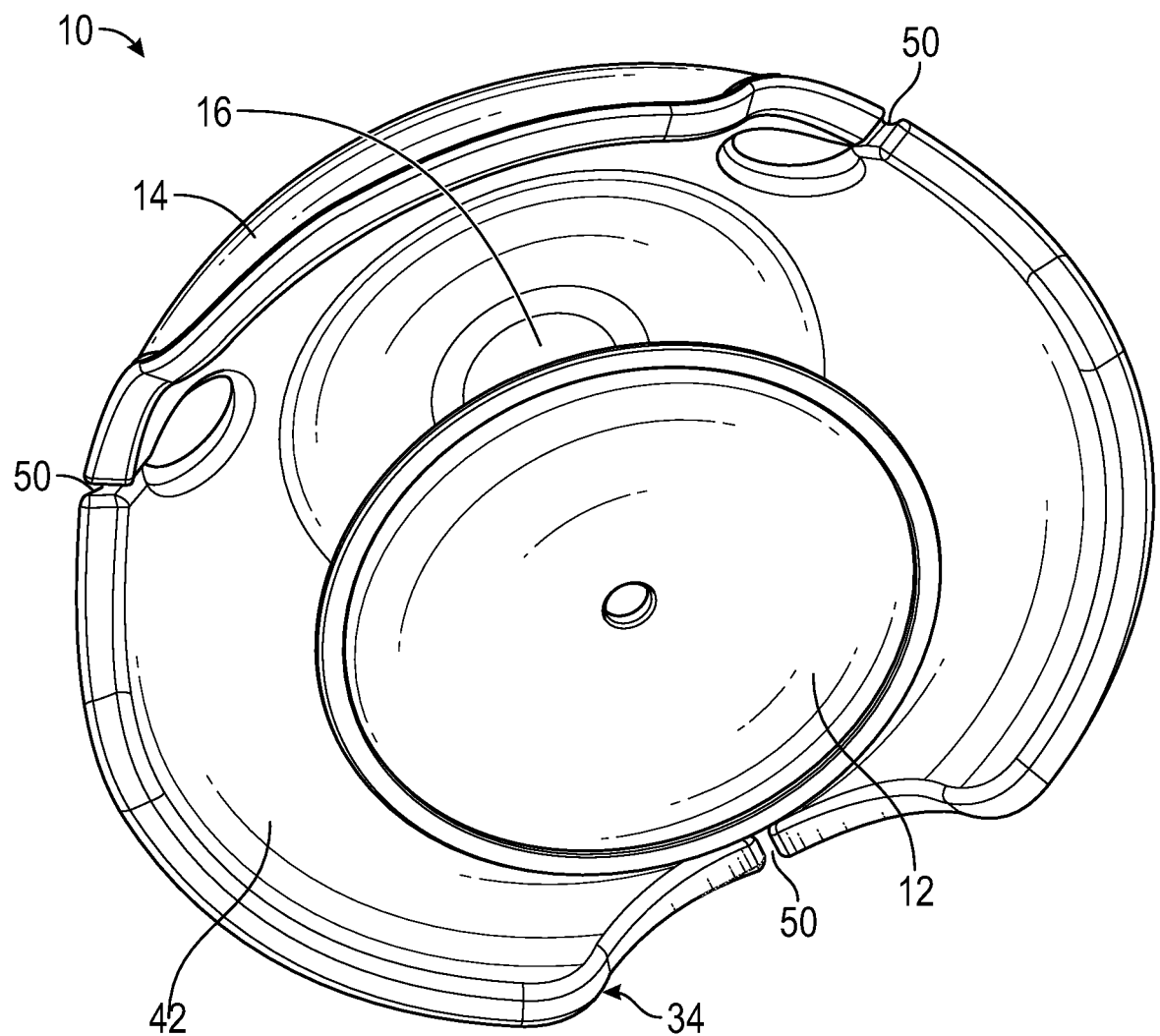
FIG. 20 shows a perspective bottom view of one embodiment of a device for storing an electrical cord of an appliance.
Figure 21:
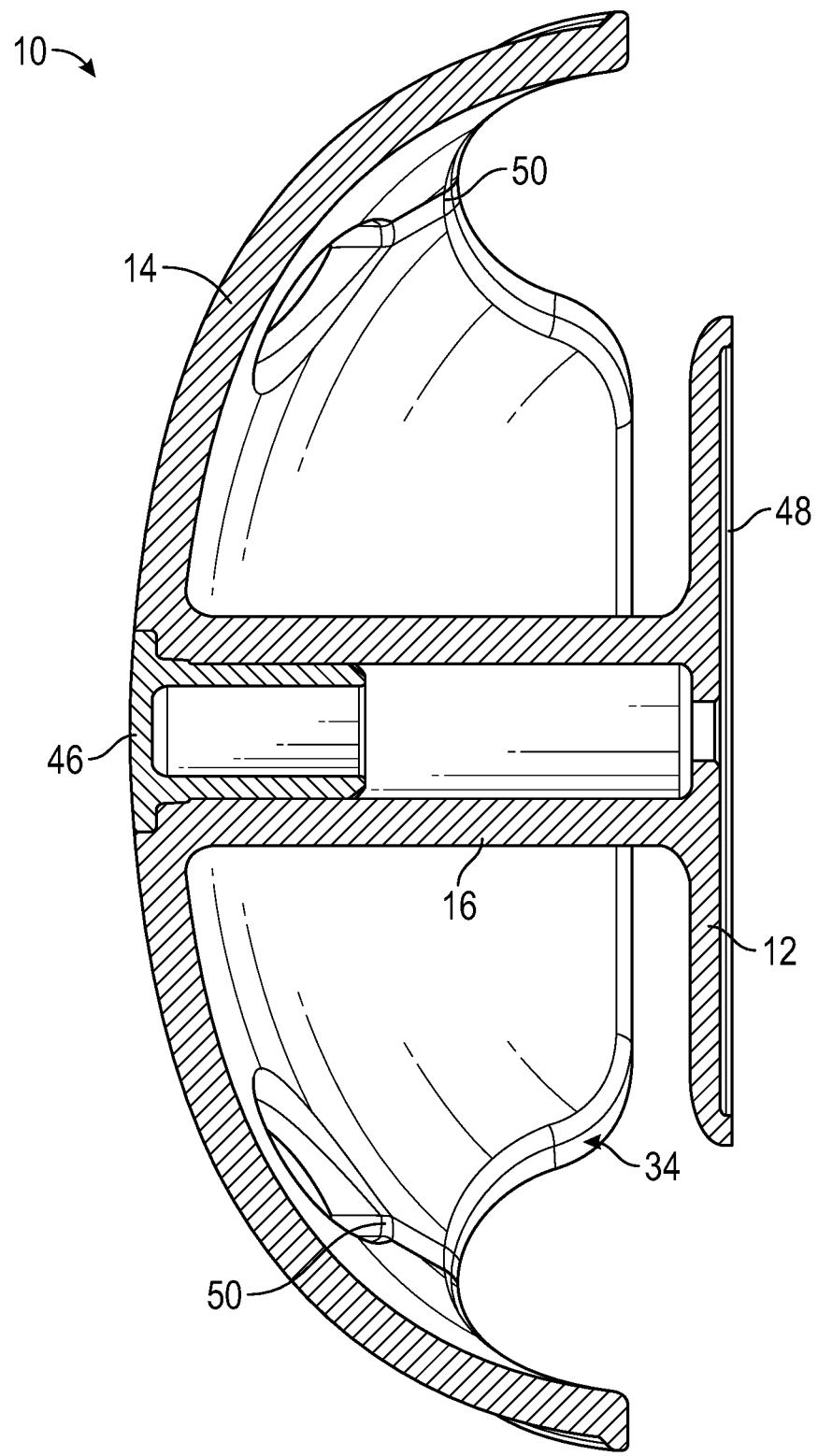
FIG. 21 shows a cross-sectional view of one embodiment of a device for storing an electrical cord of an appliance.
Figure 22:
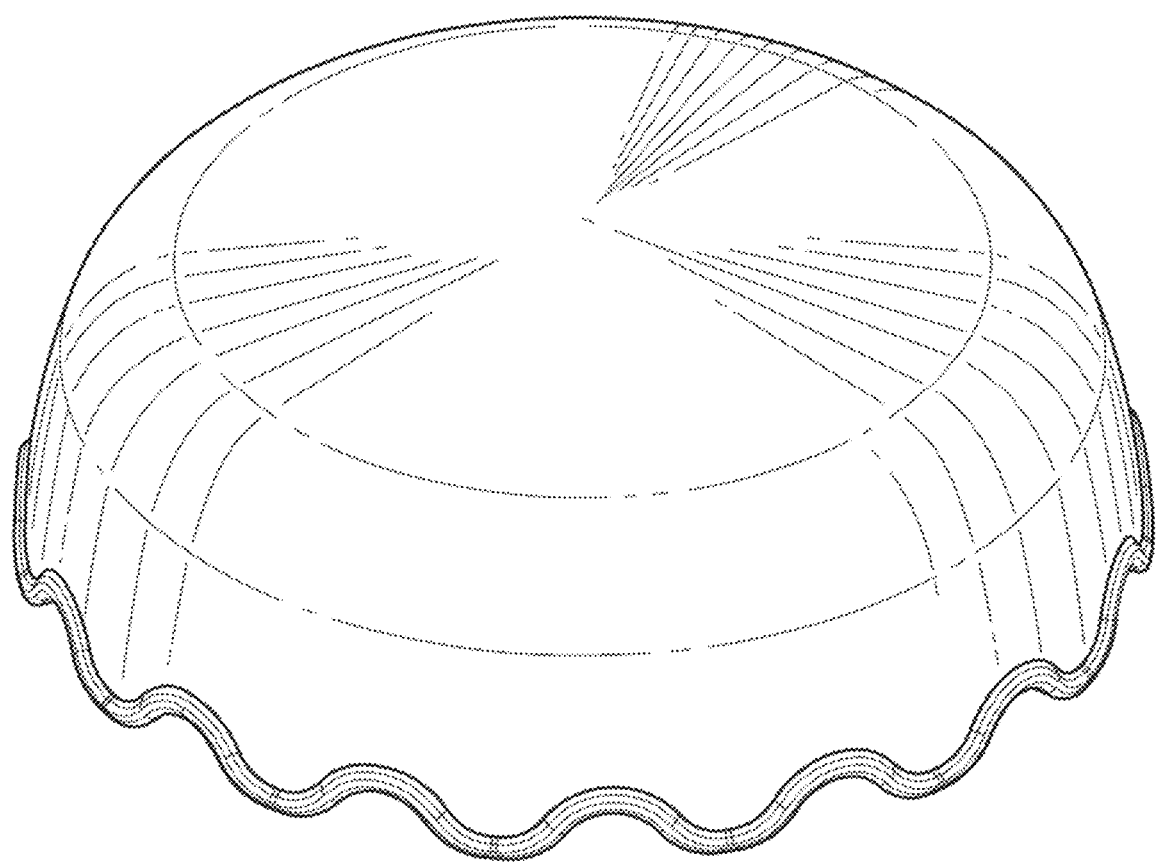
FIGS. 22-30 show various views of some embodiments of a device for storing an electrical cord of an appliance.
Figure 23:
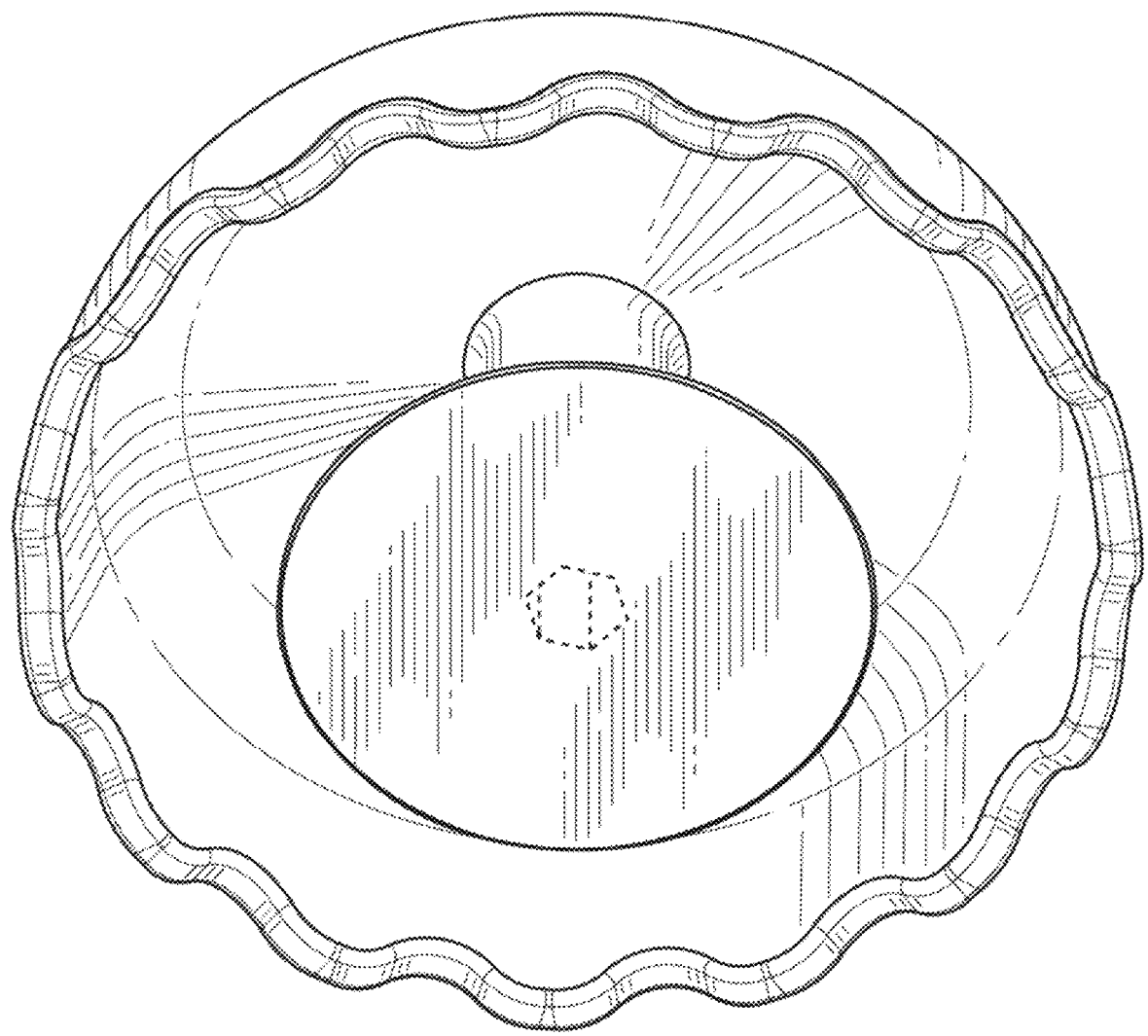
Figure 24:
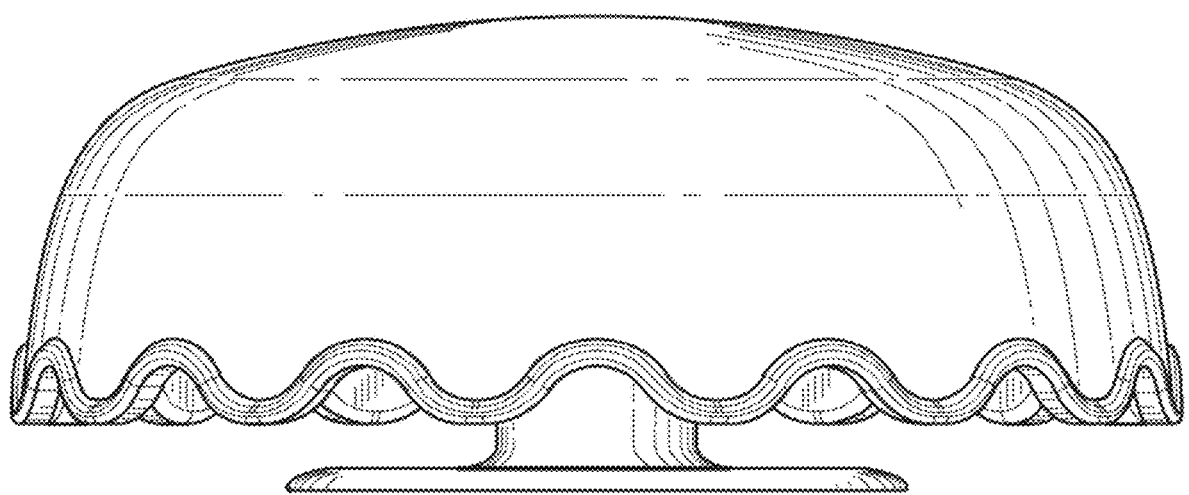
Figure 25:
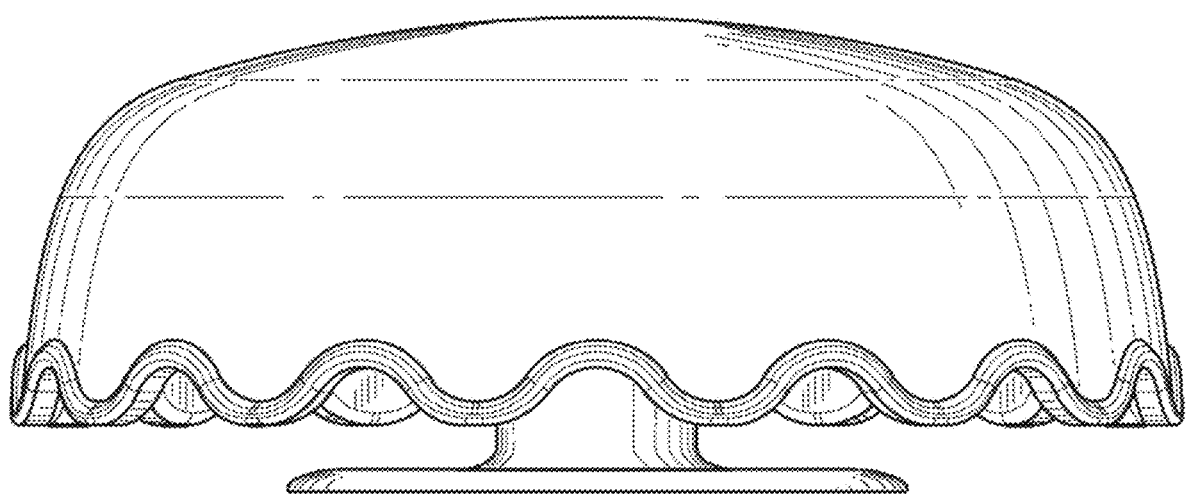
Figure 26:
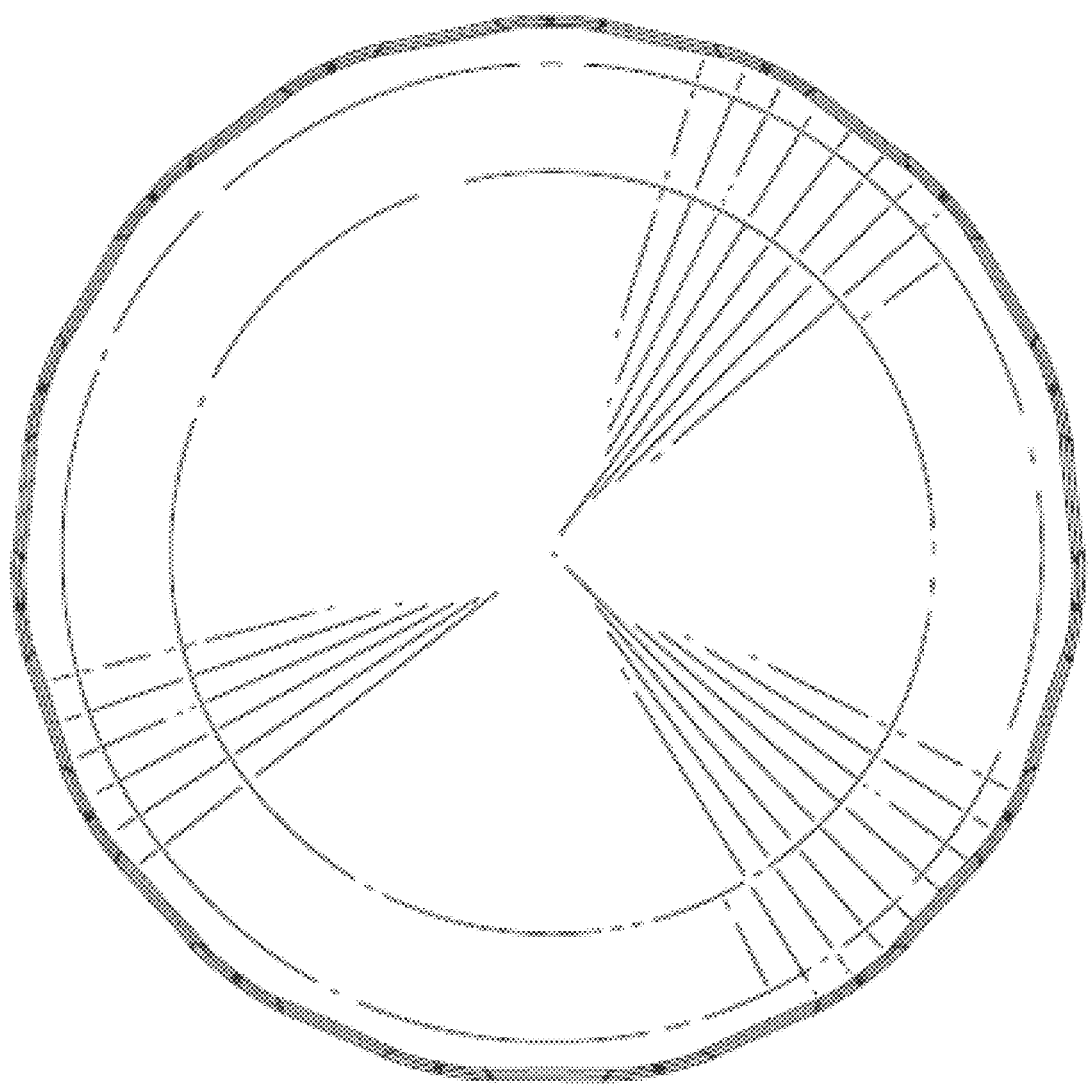
Figure 27:
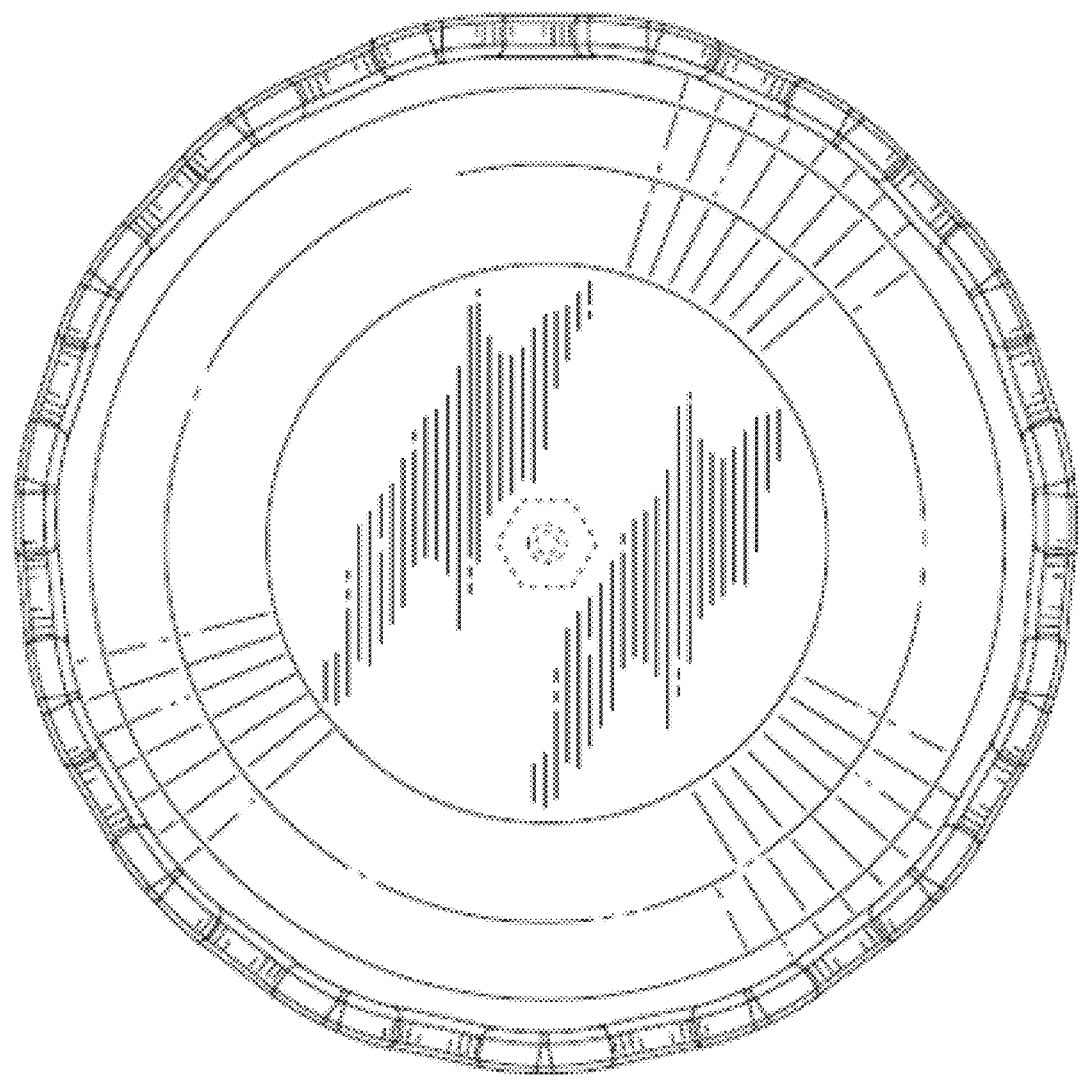
Figure 28:
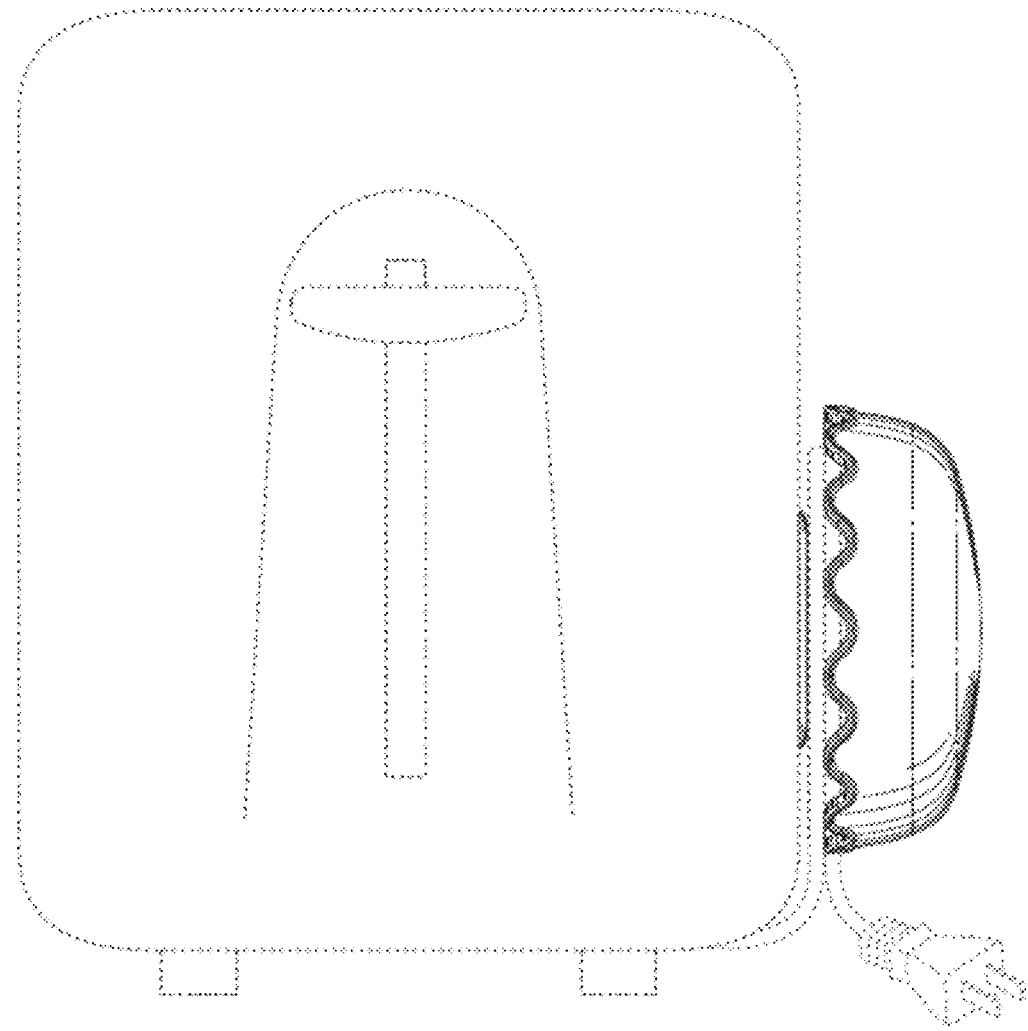
Figure 29:
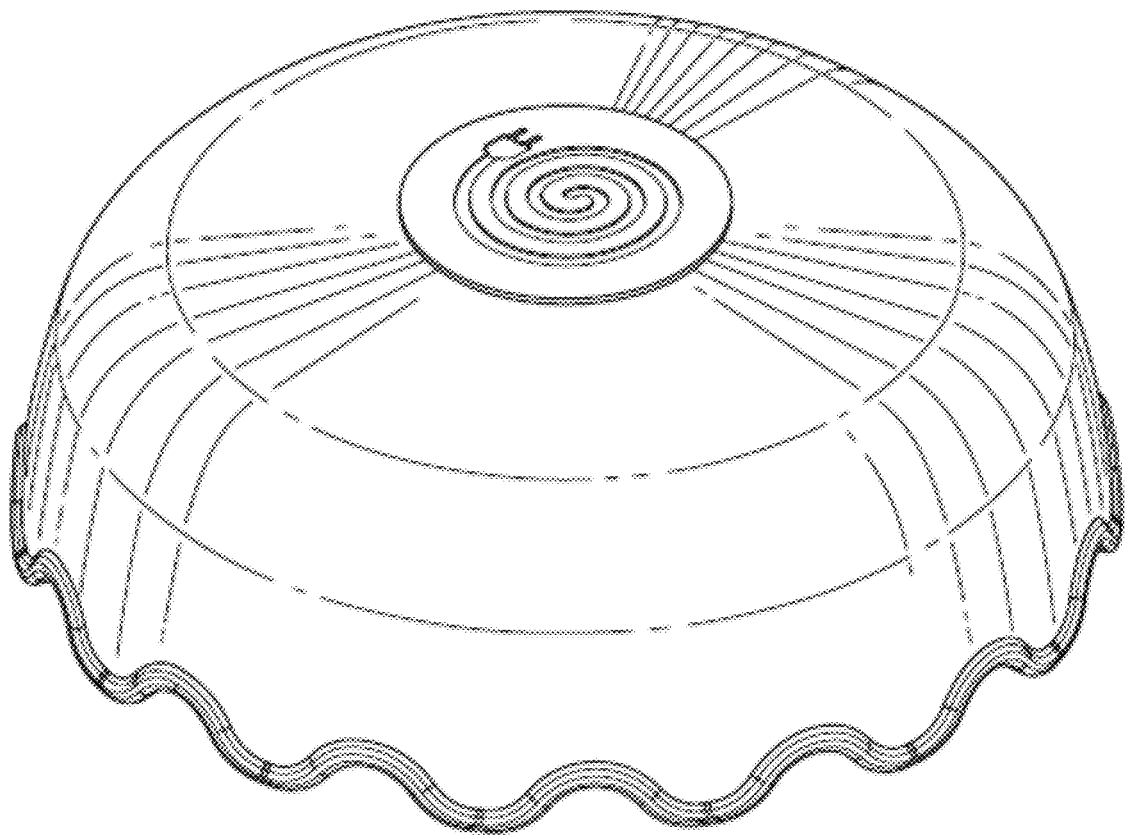
Figure 30:
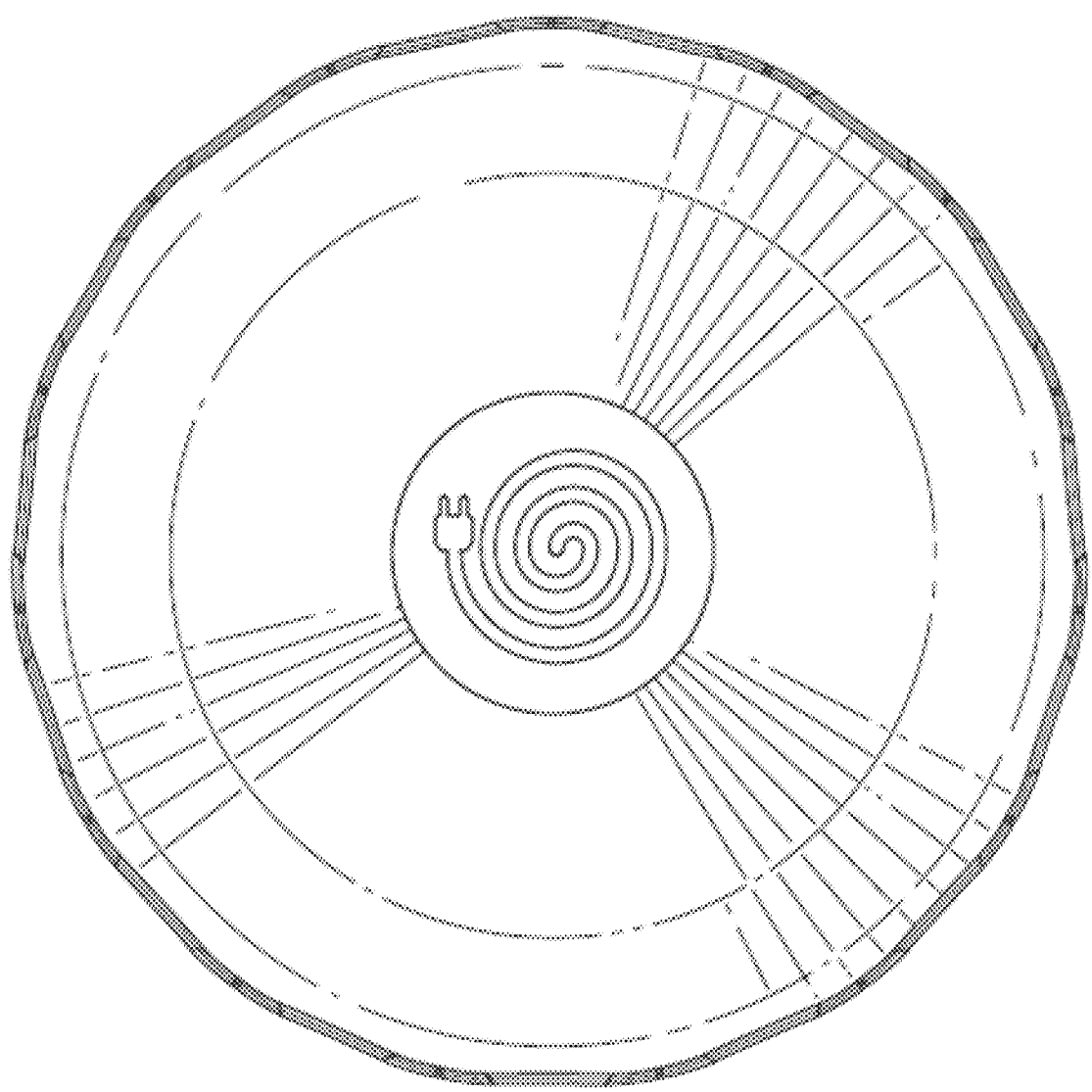

FIGS. 19-21 illustrate another embodiment of the device 10. FIG. 19 provides a perspective view of the device 10, FIG. 20 shows a bottom perspective view of the device 10, and FIG. 21 shows a side cross-sectional view of the device 10. In this embodiment, the dome 14, the post 16, and the base 12 are all unitarily formed of a single material. As with the other embodiments of the device 10 discussed previously, this embodiment could also be manufactured in multiple parts later joined together, and those embodiments could be unitarily formed as is the embodiment of FIGS. 19-21. This embodiment includes a top cap 46, which may be adorned with a logo or other decoration, allowing the device 10 to be readily customized for promotional or decorative purposes, by insertion/removal of the cap 46. The cap 46 is inserted in a receptacle formed in the post 16. The base 12 includes a recess 48 adapted to receive a version of the adhesive material 26 therein.

The dome 14 of this embodiment includes one or more (e.g., a plurality of) notches 50 spaced around the edge 34 of the dome 14. These notches 50 are adapted to releasably receive a portion of the electrical cord of the appliance therein to secure the electrical cord against unintended unwinding. Accordingly, the user can wind the electrical cord around the post 16 a desired amount, and can then insert the electrical cord into any one of the notches 50 to secure the electrical cord at the wound position.

As may be seen in the embodiments of FIGS. 13-21, the base 12 of such embodiments is sized to be significantly smaller than a maximum width of the dome 14. To save in materials and production costs, the base 12 is reduced in size in some embodiments to a minimum size determined to be necessary to provide a desired adhesion to the underlying appliance. Accordingly, embodiments of the invention are not limited to any particular relationship in the width of the base 12 relative to the width of the dome 14.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. An electrical cord storage device adapted to be affixed to an electrical appliance, comprising:
   a base having a first surface adapted to be affixed to a surface of an electrical appliance and a second surface opposed to the first surface;
   a post having a first end affixed to the base and extending from the second surface of the base to a second end to form a cord-wrapping structure adapted to receive an electrical cord of the electrical appliance wound thereon; and
   a dome affixed to the second end of the post, extending radially away from the post, and curving toward an imaginary plane substantially normal to the post located at the first end of the post, wherein the dome has a scalloped perimeter spaced around the post, the scalloped perimeter having a plurality of grooves that are configured to catch the electrical cord to prevent unintended unwinding of the electrical cord from around the post and to maintain the electrical cord in a desired position.

2. The device as recited in claim 1, wherein the dome comprises an internal concave surface that faces towards the second surface of the base, wherein a projection that is integrally formed with the dome extends from a central portion of the internal concave surface and is coupled to the post.

3. The device as recited in claim 1, wherein the scalloped perimeter is spaced apart from the base such that a gap is formed 360 degrees around the electrical storage device between the scalloped perimeter and the base such that the electrical cord fits between the scalloped perimeter and the based.

4. The device as recited in claim 3, further comprising an affixation material affixed to the first surface of the base and adapted to be affixed to the surface of the electrical appliance.

5. The device as recited in claim 1, wherein a diameter of the base is smaller than a diameter of the dome such that a gap is formed 360 degrees around the electrical storage device between the scalloped perimeter and the base.

6. The device as recited in claim 1, wherein the base is formed of a flexible and heat tolerant material, whereby the base is configured to flexed to better adapt to a shape of the surface of the electrical appliance.

7. The device as recited in claim 1, wherein an outer edge of the dome is spaced apart from the imaginary plane by a distance adapted to permit entry of the electrical cord and adapted to generally prevent unintended unwinding of the electrical cord from the post.

8. The device as recited in claim 1, further comprising an affixation material affixed to the first surface of the base and adapted to be affixed to the surface of the electrical appliance.

9. The device as recited in claim 1, wherein the scalloped perimeter is spaced apart from the base such that a gap is formed 360 degrees around the electrical storage device between the scalloped perimeter and the base such that the electrical cord fits between the scalloped perimeter and the base.

10. The device as recited in claim 9, wherein the a diameter of the base is smaller than a diameter of the dome.

11. A method for providing storage for an electrical cord on a surface of an electrical appliance, the method comprising steps of:
   providing an electrical cord storage device, the electrical cord storage device comprising:
      a base having a first surface shaped to substantially conform to and adapted to be affixed to a surface of an electrical appliance and a second surface opposed to the first surface;
      a post having a first end affixed to the base and extending from the second surface of the base to a second end to form a cord-wrapping structure adapted to receive an electrical cord of the electrical appliance wound thereon; and
      a dome affixed to the second end of the post, extending radially away from the post, and curving toward an imaginary plane substantially normal to the post located at the first end of the post, the dome having a scalloped perimeter spaced around the post, the scalloped perimeter having a plurality of grooves that are configured to catch the electrical cord to prevent unintended unwinding of the electrical cord from around the post and to maintain the electrical cord in a desired position; and
   affixing the electrical cord storage device to the surface of the electrical appliance.

12. The method as recited in claim 11, further comprising securing a plug end of the electrical cord under the dome.

13. The method as recited in claim 11, further comprising disposing a portion of the electrical cord in at least one of the plurality of grooves of the scalloped perimeter of the dome.

14. The method as recited in claim 11, wherein affixing the electrical cord storage device to the surface of the electrical appliance comprises using an adhesive between the electrical cord storage device and the surface of the electrical appliance.

15. The method as recited in claim 11, wherein an affixation of the electrical cord storage device to the surface of the electrical appliance is an affixation selected from the group consisting of a substantially permanent affixation and a reversible affixation.

16. An electrical cord storage device adapted to be affixed to an electrical appliance, comprising:
- a base having a first surface adapted to be affixed to a surface of an electrical appliance and a second surface opposed to the first surface;
- a post having a first end affixed to the base and extending from the second surface of the base to a second end to form a cord-wrapping structure adapted to receive an electrical cord of the electrical appliance wound thereon; and
- a dome affixed to the second end of the post, extending radially away from the post, and curving toward an imaginary plane substantially normal to the post located at the first end of the post, the dome having a scalloped outer-most perimeter spaced around the post, the scalloped outer-most perimeter having a plurality of grooves that are configured to catch the electrical cord to prevent unintended unwinding of the electrical cord from around the post and to maintain the electrical cord in a desired position, wherein a diameter of the dome is greater than a diameter of the base, and wherein the scalloped outer-most perimeter of the dome is spaced apart from the imaginary plane by a distance, thereby forming a 360 degree gap between the scalloped outer-most perimeter of the dome and the imaginary plane, the 360 degree gap being configured to permit entry of the electrical cord between the scalloped outer-most perimeter of the dome and base.

17. The electrical cord storage device of claim 16, wherein the base is integrally formed with the first end of the post, and wherein the dome is integrally formed with a portion of the second end of the post.

18. The electrical cord storage device of claim 17, wherein the first end of the post is connected with the portion of the second end of the of post in a connection selected from the group consisting of a permanent connection, a semi-permanent connection, and a selective connection.

19. The electrical cord storage device of claim 16, wherein the base comprises a flexible material, whereby the base is configured to be flexed to adapt to a non-flat portion of the surface of the electrical appliance.

20. The electrical cord storage device of claim 19, wherein the base further comprises an adhesive that is configured to be applied directly to the surface of the electrical appliance, and wherein the adhesive is temperature resistant such that the base is configured to remain adhered to the surface of the electrical appliance even when the surface of the electrical appliance is heated beyond a resting temperature of the electrical appliance through operation of the electrical appliance.

* * * * *